United States Patent [19]

Fujiwara

[11] Patent Number: 5,784,465
[45] Date of Patent: Jul. 21, 1998

[54] STEREO RECEIVER

[75] Inventor: Akihiro Fujiwara, Kobe, Japan

[73] Assignee: SGS-Thompson Microelectronics, S.A., Lorient, France

[21] Appl. No.: 706,348

[22] Filed: Aug. 30, 1996

[30] Foreign Application Priority Data

Aug. 31, 1995 [JP] Japan .................................. 7-224168

[51] Int. Cl.$^6$ ............................................. H04H 5/00
[52] U.S. Cl. ........................... 381/10; 318/11; 318/13
[58] Field of Search .............................. 381/10, 11, 7, 381/13, 1, 94.1; 455/222, 296

[56] References Cited

U.S. PATENT DOCUMENTS

| | | | |
|---|---|---|---|
| 5,432,854 | 7/1995 | Honjo et al. | 381/10 |
| 5,455,866 | 10/1995 | Ohashi | 381/10 |

FOREIGN PATENT DOCUMENTS

| | | |
|---|---|---|
| 4-167823 | 6/1992 | Japan . |
| 5-11566 | 2/1993 | Japan . |

Primary Examiner—Vivian Chang
Attorney, Agent, or Firm—Allen, Dyer, Doppelt, Milbrath & Gilchrist, P.A.

[57] ABSTRACT

The invention is directed to reducing noises of a low density without causing the listener to feel a sense of incongruity. A received signal is subjected to frequency discrimination. The sound signals of the right-channel and the left-channel are separated on the basis of a channel separation, and then are output as sounds. When noises are not generated, the channel separation is controlled in accordance with a control voltage corresponding to the electric field strength of the received signal which is output from an S-meter circuit via a channel separation controlling circuits. When noise signal in the received signal are extracted by a multipath detector, the first and the second integration circuits integrate the noise signal. When the noise density is so low that only the first integration circuit reaches the on-voltage, the channel separation is lowered to about 10 dB in accordance with the control voltage corresponding to the noise density of the channel separation controlling circuit. When the noise density is so high that both the first and the second integration circuit reach the on-voltage, the channel separation is lowered to about 4 dB or less in accordance with the control voltage corresponding to the noise density of the channel separation controlling circuit.

7 Claims, 10 Drawing Sheets

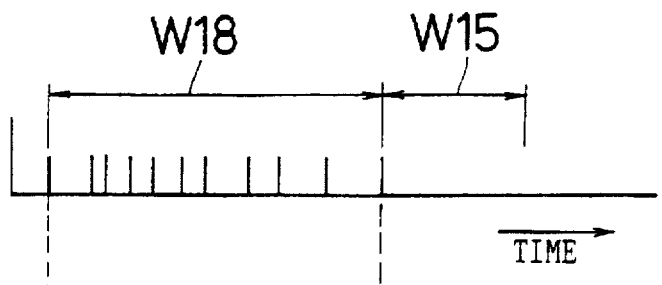
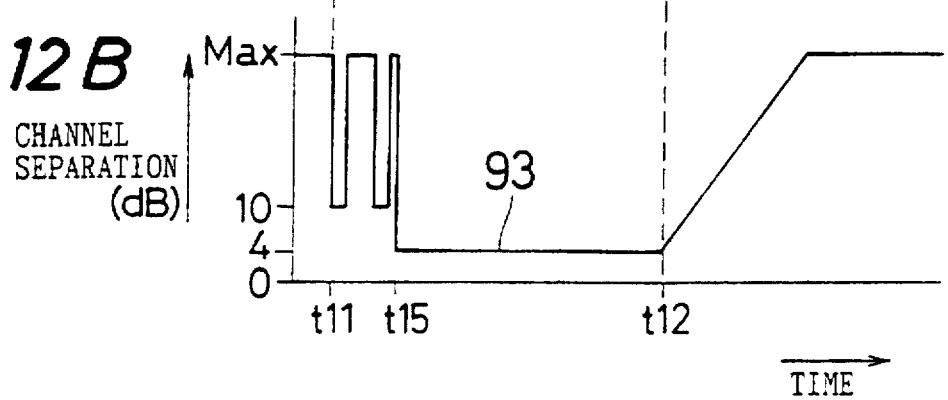
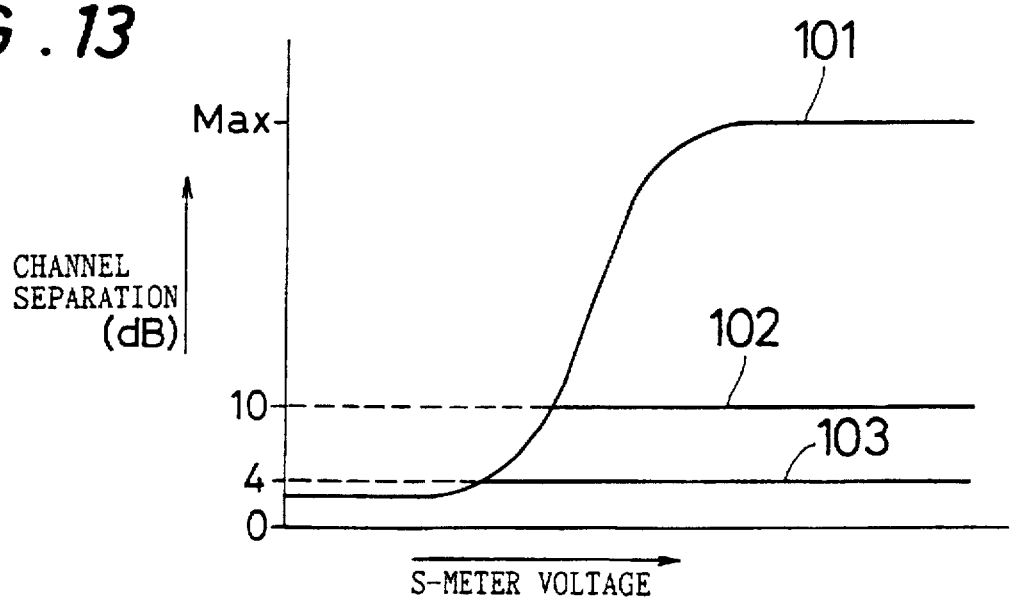

STEREO RECEIVER

BACKGROUND OF THE INVENTION

1. Field of the Invention

The present invention relates to a stereo receiver which receives, for example, a frequency-modulation stereophonic broadcast.

2. Description of the Prior Art

For example, in a receiver for a frequency-modulation (hereinafter, abbreviated as "FM") stereophonic broadcast multipath noises may be mixed with received broadcast signals. Multipath noises are noises which are generated when a single receiving antenna simultaneously receives a plurality of broadcast signals transmitted through transmission paths having different lengths, such as a direct wave which directly reaches a receiving antenna from a transmitting antenna, and a reflected wave which is a broadcast signal transmitted from the transmitting antenna and reaches the receiving antenna after being reflected by an object. Such multipath noises are suddenly generated.

As a technique for reducing multipath noises, there is available a method in which a channel separation of the stereophonic broadcasting is lowered when multipath noises are generated. The channel separation refers to a degree by which, when the stereophonic broadcasting is transmitted, a signal of the left or right channel leaks to be mixed with a signal of the right or left channel. As the channel separation is lowered, a noise level of a sound which is reproduced by demodulating a transmitted signal is lowered, and the reproduced sound is heard by the listener as a sound which is similar to a monophonic sound.

In order to reduce noises such as multipath noises which are suddenly generated, it is required to lower the channel separation at the same time when noises are generated. Furthermore, as the channel separation becomes lower, the reproduced sound is heard by the listener as a sound which is more similar to a monophonic sound. In order to provide the listener with a satisfactory stereophonic broadcasting, therefore, the channel separation must be rapidly increased after the noises disappear, thereby bringing back the reproduced sound to a stereophonic sound.

When the channel separation is lowered each time multipath noises are intermittently generated, the reproduced sound is heard by the listener as a sound in which the sound image and the localization of the reproduced sound, and the outputs of the right and left speakers change intermittently. Consequently, each time the channel separation is lowered, the listener feels a sound fluctuation and also hears the sound as if the stereophonic sound is switched to a monophonic sound. As a result, the listener of the stereophonic broadcasting feels a sense of incongruity.

In order to reduce such a change in reproduced sound, a technique has been proposed whereby the channel separation is lowered only when multipath noises of a higher incidence are generated. FIGS. 17 to 19 are graphs showing relationships between generation timings of multipath noises and change in the channel separation in the case where the technique is employed for lowering the channel separation only when multipath noises of a higher incidence are generated.

Channel separation controlling means used in such a technique incorporates, for example, an integration circuit. When multipath noises are generated, a capacitor of the integration circuit is charged in accordance with the number of occurrences of the noises. When the generation of multipath noises ceases, the capacitor starts to be discharged. When the output level of the integration circuit is not lower than a predetermined level, the channel separation controlling means controls the channel separation so as to be lowered.

In the case where the noise density is low or the number of occurrences of the noises in a unit of time is small, the next multipath noise is singly generated as shown in FIG. 17A after the end of the discharge of the capacitor of the integration circuit due to a multipath noise. When such intermittent noises are mixed with a broadcast signal, the channel separation is not lowered and always maintains the maximum value Max as shown by a line 1 of FIG. 17B.

Furthermore, for example, in the case where the noise density is on a medium level, two or three multipath noises are continuously generated in a unit of time as shown in FIG. 18A. After the generation of these multipath noises first ceases, the multipath noises are generated two or three times continuously before the end of the discharge of the capacitor due to the multipath noises. In this case, the generation of two or three multipath noises is repeated more than once with the result that, as shown by the curve 2 of FIG. 18B, the channel separation is lowered at time t1 when the capacitor is sufficiently charged. At this time, the channel separation is lowered to a value S1 which is in the vicinity of 0 dB. When the generation of two or three multipath noises ceases after time t1, the channel separation is gradually returned to the maximum value Max with expending a period from time t2 to t3.

Furthermore, in the case where the noise density is even higher, many noises are continuously generated in a short unit of time as shown in FIG. 19A. In this case, as shown by the curve 3 of FIG. 19B, the capacitor of the integration circuit is immediately charged to a sufficient level by the generation of the first noise, and hence the channel separation is lowered at time t4 which is earlier than time t1. When the generation of all the noises ceases, the channel separation which has been lowered is gradually returned to the maximum value Max during a period from time t5 to time t6.

As described above, in the case where, the channel separation is lowered only when many multipath noises are continuously generated or when multipath noises of a higher density are generated, it becomes difficult to reduce a noise which is singly generated or multipath noises which are generated at a noise density lower than a predetermined density, such as the above-mentioned two or three noises. Furthermore, in the case where multipath noises which are generated at a noise density lower than a predetermined density are reduced as shown in FIG. 18, the attack time, i.e., the time period from the generation of noises to the lowering of the channel separation is longer than that in the case where many noises are continuously generated as shown in FIG. 19.

Furthermore, in the above-described technique, when multipath noises are to be reduced, the channel separation is lowered to a value in the vicinity of 0 dB. When the lowered channel separation is to be returned to the original maximum value Max, the channel separation is gradually increased and is slowly returned to the original value. This is conducted in order to prevent the listener from sensing that the sound mode is suddenly switched from the monophonic sound to the stereophonic sound by an abrupt change in the channel separation, or from sensing the so-called sound fluctuation.

As a result, when the noise density is on a medium level, as shown in FIG. 18, a release time for returning the channel separation from a lowered state to the maximum state, i.e., the period from time t2 to time t3 is longer than the period when the channel separation is lowered in order to reduce noises, i.e., the period from time t1 to time t2. Therefore, the period when the channel separation is lowered is longer than that when noises are to be reduced.

Prior art techniques for solving these problems are disclosed in Japanese Unexamined Patent Publication JP-A 4-167823 (1992) and Japanese Unexamined Utility Model Publication JP-U 5-11566 (1993). In a multipath noise reduction circuit disclosed in JP-A 4-167823, the time constant of a time-constant circuit is changed in accordance with the multipath noise density so that the recovery period of the switching between the monophonic sound and the stereophonic sound is changed depending on the multipath noise density. In a multipath noise reduction circuit disclosed in Japanese Unexamined Patent Publication JP-A 5-11566 (1993), another capacitor C1 is connected to a capacitor C1 for controlling the recovery period via a time constant circuit and a transistor so that the recovery period of the switching between the monophonic sound and the stereophonic sound is changed in accordance with the change of the mixture period of multipath noises. When the multipath noise density is high or when the mixture period of multipath noises is long, these circuits can prevent the switching between the monophonic sound and the stereophonic sound from frequently occurring. When the noise density is low or noises of a short mixture period are discretely generated, however, the monophonic sound and the stereophonic sound are frequently switched over with the result that these circuits hardly suppress the sound fluctuation.

SUMMARY OF THE INVENTION

It is an object of the invention to provide a stereo receiver which does not cause a listener to feel a sense of incongruity in a reproduced sound and which can rapidly reduce multipath noises when the listener listens to a broadcast.

The invention provides a stereo receiver comprising:

receiving means for receiving a signal;

demodulating means for demodulating the received signal in response to an output of the receiving means;

channel separating means for calculating an output of the demodulating means on the basis of a channel separation control signal, separating the demodulated received signal into sound signals for right and left channels at a channel separation which corresponds to a level of the channel separation control signal, and outputting the sound signals;

electric field strength detecting means for detecting an electric field strength of the received signal in response to the output of the receiving means, and outputting the channel separation control signal which controls the channel separating means so that, as the electric field strength is lowered, the channel separation is lower;

noise extracting means for extracting a noise signal from the received signal in response to the output of the receiving means;

noise density measuring means for measuring a noise density in response to the noise signal of the noise extracting means;

channel separation controlling means for outputting the channel separation control signal which controls the channel separating means in response to an output of the noise density measuring means so that, as the noise density is higher, the channel separation is set to be lower in a plurality of steps or continuously; and change-over means for supplying the channel separation control signal output from the electric field strength detecting means to the channel separating means when a noise is not extracted by the noise extracting means, and supplying the channel separation control signal output from the channel separation controlling means to the channel separating means when the noise is extracted.

According to the invention, the stereo receiver demodulates a receiving signal such as a broadcast signal such as that of an FM stereophonic broadcasting received by the receiving means by the demodulating means, and separates sound signals of right and left channels from the demodulated received signal, thereby reproducing the stereophonic broadcast. Specifically, the sound signals of right and left channels are separated by calculating the demodulated received signal on the basis of the channel separation indicated by the channel separation control signal which will be described later, by the channel separating means disposed in the stage subsequent to the demodulating means. The channel separation is changed in accordance with the electric field strength of the received signal. When a sudden noise is superimposed over the received signal, the channel separation is changed in accordance with the density of the noise density irrespective of the presence or the absence of the electric field strength.

For example, a multipath interference can be given as a cause of such noises. Multipath noises caused by the multipath interference are suddenly generated and instantly reduce the electric field strength of the received signal. As a technique for reducing sudden noises in reproduced sound from a stereo receiver which receives and demodulates the stereophonic broadcast, there is available a technique for lowering the channel separation in which the sound signals of the right and left channels are separated from the received signal. The lowering of the channel separation is equivalent to a process of bringing the stereophonic sound having different sound signals in the right and left channels closer to the monophonic sound which is output having the same sound signal in the right and left channel.

In the stereophonic broadcast, a sum signal which is obtained by summing up the sound signals of the right and left channels, and a difference signal which is obtained by subjecting the sound signals of the right and left channels to subtraction to obtain the difference are contained in higher and lower frequency sides of the modulation frequency of the received signal, respectively. In the channel separating means, when the sound signals of the right and left channels are to be obtained from the sum and difference signals, noises contained in the higher frequency side of the modulation frequency can be further reduced as the proportion of the level of the difference signal to that of the sum signal. Since multipath noises tend to be contained particularly in the higher frequency side, multipath noises can be reduced by lowering the channel separation.

Accordingly, the channel separation control signal is generated on the basis of the level of the electric field strength of the received signal or the presence or the absence of superimposing of noises over the received signal. The channel separation control signal based on the electric field strength is generated by the electric field strength detecting means on the basis of the electric field strength detected by the electric field strength detecting means. This channel separation control signal controls the channel separating means so that the channel separation is lower as the electric field strength is lower.

The noises superimposed over the received signal are extracted from the received signal by the noise extracting means. When noises are extracted by the noise extracting means, the noise density measuring means of counts the number of multipath noises which are generated in a predetermined period, or measures the noise density. The channel separation controlling means generates the channel separation control signal based on the noise density. The channel separation control signal based on the noise density is a signal which sets the channel separation to be lower as the noise density is higher.

Either one of the channel separation control signal based on the electric field strength or the channel separation control signal based on the noise density is supplied by the change-over means to the channel separating means depending on the presence or the absence of noises. Specifically, when no noise is extracted by the noise extracting means, the channel separation control signal based on the electric field strength is supplied to the channel separating means so that the channel separation is changed in accordance with the change in the electric field strength. When any noise is extracted, the channel separation control signal based on the noise density is supplied to the channel separating means so that the channel separation is set to be lower as the noise density is higher.

According to this configuration, when any noise is extracted, the channel separation of the right and left channels is lowered so that reproduced noises are reduced. Depending on the case where the noise density is low and noises are discretely generated, or where the noise density is high and noises are constantly generated, the channel separation can be set to be a value depending on respective cases. Consequently, in response to the number of occurrences and the occurrence interval of noise, a sound signal can be separated at the channel separation whereby generated noise can be reduced and the stereophonic sense can be maintained as far as possible. Therefore, it is possible to prevent the listener from sensing that the sound mode is frequently switched from the stereophonic sound to the monophonic sound.

Furthermore, the invention is characterized in that the channel separating means sets the channel separation to be a value which is less than a predetermined value when the noise signal is extracted and the noise density is not lower than a predetermined density, and sets the channel separation to about 10 dB when the noise signal is extracted and the noise density is lower than a predetermined density;

the predetermined value being set to be a value at which a noise can be sufficiently reduced.

According to the invention, when the channel separating means receives the channel separation control signal based on the noise density, the channel separating means reduces the channel separation stepwise. Specifically, when the noise density is not lower than the predetermined density, the channel separation is set to be a value at which noises can be sufficiently lowered. When the noise density is lower than the predetermined density, the channel separation is set to be about 10 dB.

In, the stereophonic broadcast, as the channel channel separation is further lowered, noises in reproduced sound can be further reduced. As the channel separation of the channels is further lowered, the sound signal either in the right or the left channel interferes into the sound signal in the opposite side channel with the result that reproduced sound is brought closer to the monophonic sound. When noises are generated, and particularly when the noise density is high and many noises are generated in a short period, therefore, it is preferable to lower the channel separation to a value at which noises are sufficiently reduced. For example, a value of such channel separation is 4 dB or less. When a sound signal is separated at the channel separation which is lowered to 4 dB or less, the reproduced sound is similar to the monophonic sound.

The stereophonic sound is different from the monophonic sound in the sound image, the localization, and the sound pressure of outputs of right and left speakers. Consequently, when the channel separation is reduced to a predetermined value of, for example, 4 dB or less each time a noise is generated, the listener feels that the sound mode is frequently switched between the stereophonic sound and the monophonic sound, and feels a sense of incongruity.

When the noise density is lower than the predetermined density, noises are generated only in an intermittent manner or for a short period. Therefore, noises can be sufficiently reduced only by lowering the channel separation to about 10 dB. When the channel separation is lowered to about 10 dB, the listener hardly feels that the stereophonic sound approaches the monophonic sound, and hence does not feel a large change in the stereophonic sense whereby the listener is caused to feel the listening of the stereophonic sense.

As a result, in the stereo receiver, the channel separation is set to be a value which is less than the predetermined value only when the noise density is high and many noises are generated, so that the stereophonic sound is made similar to the monophonic sound as close as possible, thereby providing the reduction of noises thereby giving a priority to the sound reduction over the maintenance of the stereophonic sense. When the noise density is low, the channel separation is retained to a level at which the stereophonic sense is maintained, so that noises are reduced while maintaining the stereophonic sense. According to this configuration, when noises are generated discretely and in a reduced number of occurrences, it is possible to reduce noises and prevent the loss of the stereophonic sense. Consequently, noises generated at a low density can be reduced without changing the sound image and the localization without giving a sense of incongruity to the listener. As a result, it is possible to prevent the stereophonic sound from frequently coming close to the monophonic sound each time noises are generated, and the listener from feeling the so-called sound fluctuation.

Furthermore, the invention is characterized in that when a noise signal is not extracted from the received signal after the channel separating means is controlled so as to lower the channel separation, the channel separation controlling means performs a control so that the channel separation is made higher in order to be returned to an original value with a lapse of time; and the time-change rate of the channel separation which is made higher with a lapse of time is set to be lower as the noise density is lower.

According to the invention, when no noises are generated after noises are once generated and the channel separation is lowered, the channel separation controlling means gradually increases the channel separation with a lapse of time so that the channel separation is returned to the value attained before the generation of the noises. The time-change rate at which the channel separation is made higher is determined in accordance with the noise density.

As described above, when the channel separation is lowered in order to reduce the noises, for example, the stereophonic sound comes close to the monophonic sound which is different from the stereophonic sound in the sound image and the localization. In the case wherein, after the channel separation is once lowered and the reproduced sound is made closer to the monophonic sound, the channel separation is returned to a value attained before the generation of noises, when the channel separation is abruptly returned from a low level, the listener feels the sound fluctuation in the reproduced sound because of differences in the sound image and the localization.

When noises are generated, the channel separation is lowered to a value which is determined on the basis of the noise density of the generated noises. When the noise density is lower than the predetermined density, for example, the channel separation is lowered to about 10 dB. At this time, the listener does not feel a change in the stereophonic sound due to the lowering of the channel separation. Even when the channel separation which is once lowered to about 10 dB is abruptly returned to the value attained before the generation of noises, therefore, changes in the sound image and the localization caused by the returning operation are small. In other words, as the lowered channel separation is larger, the listener hardly feels the sound fluctuation during the recovery of the channel separation.

As a result, even when the channel separation is returned in a short period in the case where the noise density is low, the sense of incongruity due to the switching of the monophonic sound and the stereophonic sound is reduced. This enables the release time which is a period from a time when noises are not extracted and a time when the lowered channel separation is returned to the original value, to be made shorter as the noise density is lower. Accordingly, the period when the channel separation is to be lowered can be shortened in accordance with the noise density, and the period when the stereophonic sound is outputted is prolonged, with the result that noises can be reduced and the stereophonic sense of the reproduced sound can be maintained. Furthermore, the release time is longer than a period when, in the case where the noise density is low, noises are reduced in the prior art. Therefore, the period when the stereophonic sound is not provided can be prevented from being unnecessarily prolonged.

Furthermore, the invention is characterized in that when the noise density is higher than the predetermined density, the time-change rate of the channel separation is set so that the release time required for returning the channel separation which is set to be lower than the predetermined value, to the channel separation which is determined in accordance with the electric field strength of the received signal is about 1 second or longer.

According to the invention, as described above, in the case where the channel separation is set to be a value of, for example, 4 dB or less at which noises can be sufficiently reduced, the listener feels that the reproduced sound is similar to the monophonic sound. At this time, the channel separation must be gradually increased so that the listener does not feel that the switching of the monophonic sound and the stereophonic sound suddenly occurs. To comply with this, the release time in the case where a next noise is not detected during the period from the end of the extraction of a noise to the return of the channel separation to the value attained before the noise extraction is set to be 1 second or longer, and the time-change rate at which the channel separation is made higher is determined so that the release time satisfying such conditions is attained. When the channel separation is gradually raised in such a long period, the listener feels that the sound which has been made similar to an analog sound as close as possible is returned to the stereophonic sound without producing a large change in the sound image and the localization, and hence a sense of incongruity such as the sound fluctuation is not produced. As a result, a sense of the sound fluctuation which may be aroused when the switching of the monophonic sound and the stereophonic sound suddenly occurs can be reduced as far as possible. Even in a state where many noises are generated, therefore, the stereophonic broadcasting can be satisfactorily reproduced and subjected to listening.

Furthermore, the invention is characterized in that the noise density measuring means comprises:

a plurality of integration circuits which have different integration time constants of charging or discharging the noise signal from the noise extracting means; and a plurality of level discriminating circuits which individually discriminate levels of integration outputs of the integration circuits according to individual predetermined discrimination levels which are equal to each other, and the channel separation controlling means controls the channel separating means in response to outputs of the level discriminating circuits when the output of the level discriminating circuits corresponding to the integration circuit having a larger integration time constant is obtained so that the channel separation is set to a value lower than the value set at the time when the output of the level discriminating means corresponding to the integration circuit having a smaller integration time constant is obtained.

According to the invention, the noise density measuring means comprises a plurality of integration circuits, and the plurality of level discriminating circuits. Each of the integration circuits integrates the noise signal output from the noise extracting means to output an integration output corresponding to the integration result. The level discriminating circuits individually discriminate the levels of the integration outputs of each of the integration circuits to supply to the channel separation control means an output indicative of a judgment on whether the corresponding integration output reaches the discrimination level or not. The discrimination levels of the level discriminating circuits are equal to each other irrespective of the integration time constants of the respective integration circuits.

In the noise density measuring means, the integration time constants of the respective integration circuits are different from each other. Consequently, when the same noise signals are supplied to the integration circuits, the integration circuit having a larger integration time constant is smaller in level increasing rate of the integration output than the integration circuit having a smaller integration time constant. Therefore, the period from the generation of a noise to the timing when the integration output reaches a predetermined discrimination level is longer as the integration time constant is larger. When many noises are extracted in a unit of time and noises of short occurrence intervals are extracted in this means, the integration outputs sequentially reach the discrimination level with starting from the circuit having a smaller integration time constant. In other words, as the noise density of the given the noise signal is higher, the integration output of an integration circuit having a larger integration time constant reaches the discrimination level.

Consequently, when the output of an integration circuit having a larger integration time constant reaches the discrimination level, the channel separation controlling means controls the channel separating means so that the channel separation is lower than that attained when the output of the integration circuit having a smaller integration time constant is obtained. As a result, the noise density can be measured by a circuit simple in structure, composed of a plurality of integration circuits and level discriminating circuits. Since the discrimination levels are equal to each other, the level discriminating circuits can be configured through the use of the circuits of the same configuration, with the result that the noise density measuring means can be simplified in configuration.

Furthermore, the invention is characterized in that the charging and discharging time constants in the absence of noises are selected so as to be larger values, the larger the discharging and charging time constants at the time when noises are extracted are, respectively.

According to the invention, the mutual relationships of time constants among the plural integration circuits in the case where noises do not exist are equal to those in the case where noises exist. When an integration circuit which can be charged by noise signals, is larger in charging time constant than other integration circuits, also the discharging time constant is larger than the discharging time constants of the other integration circuits. In the case where integration circuits are charged by noise signals, for example, the outputs of the integration circuits reach the desired discrimination level in the order of circuits having a smaller time constant. When the supply of a noise signal is stopped, the outputs of the circuits are lowered to a level lower than the discrimination level in the order of circuits having a smaller time constant.

In other words, when noises are extracted, the integration output of an integration circuit which is used for measuring a lower noise density and which has a smaller time constant reaches a discrimination level or higher at a timing earlier than that of an integration circuit which is used for measuring a higher noise density and which has a larger time constant. In addition, when the generation of noises stops, the integration output of an integration circuit which is used for measuring a lower noise density is returned to the discrimination level or lower at a timing earlier than that of an integration circuit which is used for measuring a higher noise density.

In other words, when the noise density is low, only the integration output of an integration circuit having a smaller time constant reaches the discrimination level, and, when noises are not extracted, the integration output immediately decreases to the discrimination level or lower. In addition, when the noise density is large, the integration output of a circuit having a larger time constant reaches a discrimination level next to an integration circuit having a smaller time constant. When noises are not extracted, the integration output decreases to the discrimination level or lower at a timing later than that when the noise density is low. Therefore, as the noise density is higher, an integration circuit of a later timing of reduction of the integration output is activated. The integration outputs of the integration circuits are used as a control reference of the release time of the change in the channel separation as described later. Consequently, the release time can be prolonged in accordance with the noise density.

Furthermore, the invention is characterized in that the noise density measuring means comprises:

a plurality of integration circuits which have the same integration time constant of charging or discharging the noise signal from the noise extracting means; and a plurality of level discriminating circuits which individually discriminate levels of integration outputs of the integration circuits according to individual predetermined discrimination levels which are different from each other, and the channel separation controlling means controls the channel separating means in response to outputs of the level discriminating circuits when the output of the level discriminating circuits of a higher discrimination level is obtained so that the channel separation is a value lower than the value obtained at the time when the output of the level discriminating circuits of a lower discrimination level is obtained.

According to the invention, the noise density measuring means comprises one or more integration circuits, and the plurality of level discriminating circuits which discriminate levels of integration outputs of the integration circuits. In the case of the plurality of integration circuits, the integration time constants of all the integration circuits have the same value. The discrimination levels of the level discriminating circuits are different from each other.

For example, when a noise signal is supplied to the integration circuit at the time when the integration constant of the integration circuit is a charging time constant for charging a noise signal, the noise output is higher as the generating intervals of noises are shorter and as the number of occurrences of noises is larger. In other words, as the noise density is higher, the integration output is higher. Therefore, when the integration output of the integration circuit is subjected to level discrimination by the plurality of level discriminating circuits of different discrimination levels, the output of a level discriminating circuit having a larger discrimination level is obtained as the noise density of the noise signal is higher. Since the integration outputs of the integration circuits are increased with a lapse of time, the outputs of the level discriminating circuits are sequentially supplied with starting from the circuit having a lower discrimination level, to the channel separation control circuit. Therefore, the noise density is measured by determining which of the predetermined discrimination levels the integration output is larger than.

Consequently, when the integration output of the integration circuit reaches a predetermined discrimination level, the channel separation controlling means controls the channel separating means so that, the higher the discrimination level which is lower than and closest to the integration output, is, the channel separation is set to be lower. According to this configuration, the noise density can be measured by a circuit of a simple configuration which uses the integration circuits and level discriminating circuits. Since the time constants of the integration circuits are equal to each other, the level discriminating circuits may be configured so as to judge the output of a signal integration circuit. Alternatively, the receiver may be configured by using a plurality of integration circuits having the same configuration.

The invention is characterized in that each of the level discriminating circuits comprises:

switching means for responding to the output of the integration circuit, and outputting a signal of one level when the level of the output is equal to or higher than the predetermined discrimination level, or outputting a signal of another level when the level of the output is lower than the predetermined discrimination level, and the channel separation controlling means controls the channel separating means so that, when a signal of the one level is obtained from each of the level discriminating circuits, the channel separation has a value corresponding to the level discriminating circuit which has the highest predetermined discrimination level or the largest integration time constant of the corresponding integration circuit, among the level discriminating circuits outputting the signal of the one level.

According to the invention, a signal of one level from the level discriminating circuits indicates that the noise density is not lower than a predetermined density. A signal of the other level indicates that the noise density is lower than the predetermined density. The channel separation controlling means and the change-over means obtain information of the noise density of the received signal, from the signal of the one level or the other level output from each of the switching means.

The degree of the noise density is judged in correspondence with the degree of the integration time constant of the integration circuit or that of the discrimination level of the level discriminating circuits. As the noise density is higher, the signal output timing of the level discriminating circuits is later. When a signal of the one level is supplied from the switching means of the plurality of level discriminating circuits, the channel separation controlling means sets the channel separation in accordance with the highest density among the noise densities determined by the level discriminating circuits outputting the signal of the one level. In other words, when the noise density measuring means is configured so that the discrimination levels are equal to each other, the channel separation is set in accordance with an output from the level discriminating circuits corresponding to the integration circuit having a larger integration time constant. When the noise density measuring means is configured so that the integration time constants are equal to each other, the channel separation is set in accordance with an output from the level discriminating circuits having a higher discrimination level.

According to this configuration, when noises are generated, the channel separation is gradually lowered from a value corresponding to the case where the noise density is low, to that corresponding to the case where the noise density is high. As a result, when the noise density is to be measured by using the plurality of integration circuits having different time constants, for example, the attack time which is the time period from the generation of noises to the lowering of the channel separation is always defined by the circuit having the smallest time constant.

When the generation of noises stops, the output of the integration circuit is lowered faster as the noise density is lowered. Consequently, the higher the noise density is judged, the longer the circuit is kept to supply the signal of the one level to the channel separation controlling means. As a result, the channel separation after the end of the generation of noises is controlled by the level discriminating circuits which are kept to output the signal of the one level. In this way, the channel separation controlling means can be controlled so that the attack time is always constant, on the basis of the outputs of the plurality of level discriminating circuits which judge respective noise densities. Therefore, the lowering of the channel separation can be always started within a short period, irrespective of the noise density.

BRIEF DESCRIPTION OF THE DRAWINGS

Other and further objects, features, and advantages of the invention will be more explicit from the following detailed description taken with reference to the drawings wherein:

FIGS. 12A and 12B are graphs showing relationships between generation timings of noises and a change in the channel separation in the case where the noise density is high;

FIG. 13 is a view showing relationships between the S-meter voltage and the channel separation;

DESCRIPTION OF THE PREFERRED EMBODIMENTS

Figure 1:
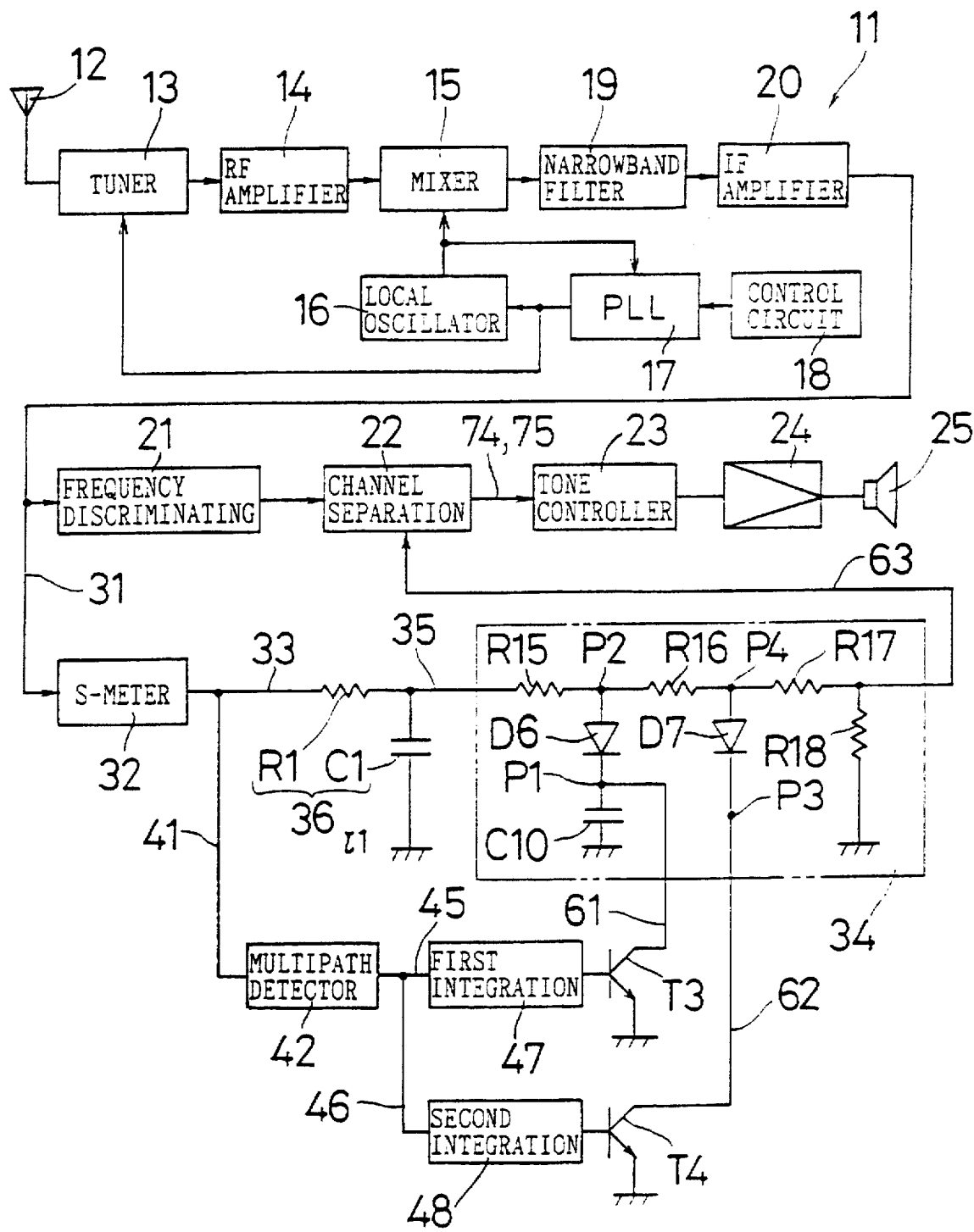
FIG. 1 is a block diagram showing an electrical configuration of a stereo receiver 11 according to an embodiment of the invention.

Now referring to the drawings, preferred embodiments of the invention are described below.

FIG. 1 is a block diagram showing an electrical configuration of a stereo receiver 11 according to one embodiment of the invention.

A broadcast signal which has been transmitted through space is received by an antenna 12. The antenna 12 outputs a received signal corresponding to the received electric field strength of the broadcast signal. In the received signal, only the signal component in the vicinity of the frequency of the desired broadcast signal which is to be received is enhanced by a tuning circuit 13. After the signal component is amplified by a radio frequency amplifier 14, the signal is input to a mixer 15. A local oscillator 16 is disposed in relation to the mixer 15. The local oscillator 16 is realized by a voltage-controlled oscillator or the like and outputs an oscillation signal of a frequency corresponding to the tuning voltage from a phase-locked loop (hereinafter, abbreviated as "PLL") circuit 17.

The PLL circuit 17 comprises a frequency divider, a reference signal source, a comparator, and a filter. The frequency divider divides the frequency of the local oscillation signal at a division ratio N corresponding to the frequency of a signal supplied from a control circuit 18 which is realized by, for example, a microcomputer. The reference signal source generates a reference signal of a predetermined reference frequency. The comparator compares the divided local oscillation signal with the reference signal, and generates an error output corresponding to the phase difference between the signals. The error output is smoothed by the filter to a DC voltage so as to be transformed into the tuning voltage, and then supplied to the local oscillator 16 and the tuning circuit 13. When the received signal is to be changed, therefore, the control circuit 18 changes the division ratio N, thereby changing the tuning voltage so that the phase difference between the reference signal and a signal obtained by dividing the local oscillation signal by the division ratio N. This enables a desired broadcast signal to be stably received.

The mixer 15 mixes the thus obtained oscillation signal with the received signal thereby obtaining an intermediate frequency signal. The intermediate frequency signal is supplied to an intermediate frequency amplifier 20 via a narrow band filter 19 which allows only frequency components containing a sound signal of the desired broadcast signal, to pass therethrough. In a receiver for the FM broadcasting, for example, the filter bandwidth of the narrow band filter 19 is selected to be about 180 kHz.

The intermediate-frequency signal amplified by the intermediate-frequency amplifier 20 is supplied to a frequency discriminating circuit 21 and the frequency is discriminated therein, whereby the sound signal is demodulated. In the channel separation circuit 22, the demodulated sound signal is subjected to the stereophonic channel separation so as to be separated into sound signals of right and left channels in accordance with channel separation which is determined as described later, and then supplied to a tone controller 23.

The tone controller 23 comprises a low-pass filter, an adder and two multipliers for each channel. The tone controller 23 can arbitrarily adjust the proportions of the low-pass filter component of the input sound signal and the bypass line component. An increase in the low-pass filter component is equivalent to the attenuation of high-frequency components of the sound signal. The output of the tone controller 23 is amplified by an amplifier 24 and then supplied to a speaker 25 to be output as a sound.

The output of the intermediate-frequency amplifier 20 is supplied to an S-meter circuit 32 via a line 31. The S-meter circuit 32 outputs a signal of a voltage corresponding to the received electric field strength of the received signal from the antenna 12. A signal of the output voltage is called an S-meter voltage. Alternatively, the received electric field strength of the received signal may be obtained by subjecting the output of the intermediate-frequency amplifier 20 to AM (Amplitude Modulation) detection.

Figure 2:
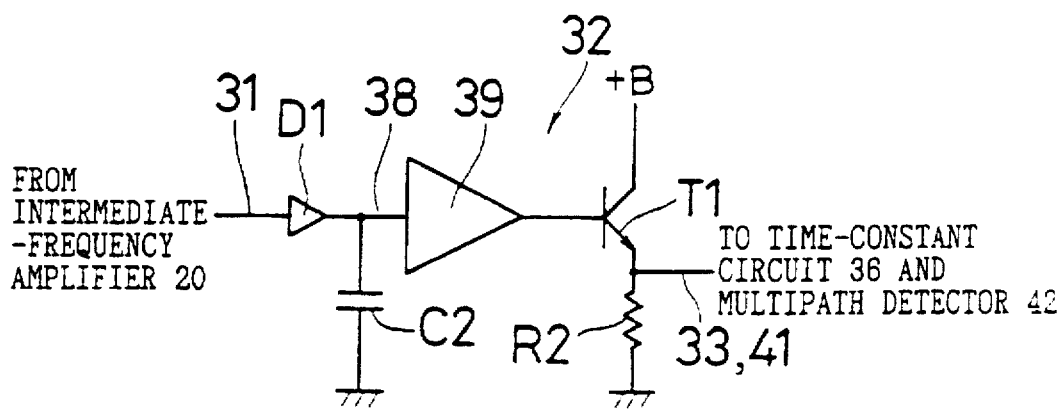
FIG. 2 is a circuit diagram showing a specific configuration of an S-meter circuit 32.
Figure 3:
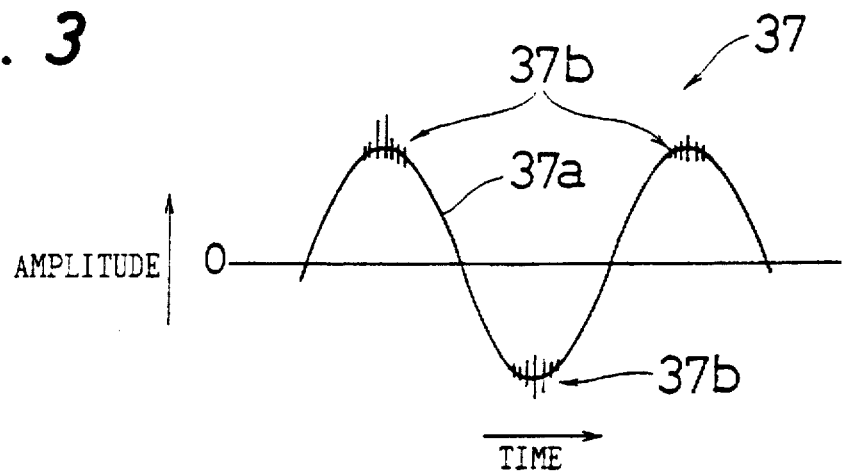
FIG. 3 is a waveform chart showing an output signal of an intermediate-frequency amplifier 20 which is supplied to the S-meter circuit 32.

FIG. 2 is a circuit diagram showing a specific configuration of the S-meter circuit 32. An output signal 37 from the intermediate-frequency amplifier 20 is supplied to the S-meter circuit 32. The output signal 37 is shown in FIG. 3. In the output signal 37, a noise signal 37b is superimposed over a part of a waveform 37a which is obtained by frequency-converting the received signal. The output signal 37 is supplied to a diode D1 via the line 31 of a conductor. The output of the diode D1 is supplied to an amplifier 39 via a line 38. A capacitor C2 is interposed between the line 38 and the ground line. The output signal 37 is smoothed by a circuit consisting of the diode D1 and the capacitor C2, amplified to a predetermined level by the amplifier 39, and then supplied to the base of a transistor T1. A voltage of a predetermined level +B is applied from a battery, which is not shown, to the collector of the transistor T1. Lines 33 and 41 are connected to the emitter of the transistor T1. A resistor R2 is interposed between the lines 33 and 41 and the ground line.

Figure 4:
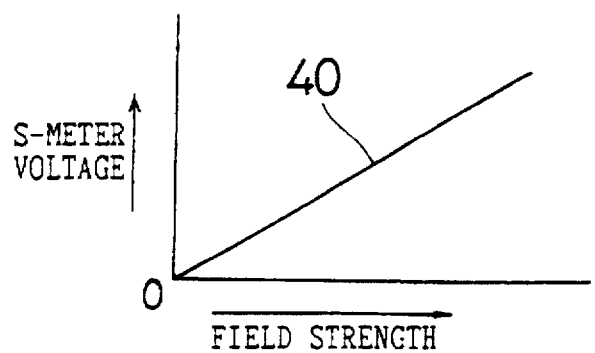
FIG. 4 is a view showing relationships between the electric field strength of the output signal of the intermediate-frequency amplifier 20 and the S-meter voltage output from the S-meter circuit 32.

FIG. 4 is a view showing relationships between the electric field strength of the output signal of the intermediate-frequency amplifier 20 and the S-meter voltage output from the S-meter circuit 32. As shown by the line 40, the electric field strength of the output signal of the intermediate-frequency amplifier 20 and the S-meter voltage output from the S-meter circuit 32 are proportional to each other.

The output of the S-meter circuit 32 is supplied to a channel separation controlling circuit 34 via the line 33. A resistor R1 is connected in series in the line 33. A capacitor C1 is interposed between a portion 35 of the line 33 which is defined by the resistor R1 and the channel separation controlling circuit 34, and the ground line. The resistor R1 and the capacitor C1 constitute a time-constant circuit 36. The time-constant circuit 36 prevents the channel separation controlling circuit 34 from operating in response to a minute momentary operation of the output of the S-meter circuit 32. The time constant τ1 of the time-constant circuit 36 is set so as to be larger than a time period of momentary fluctuation of the output of the S-meter circuit 32.

The output of the S-meter circuit 32 is supplied also to a multipath detector 42 via a line 41, in addition to the time-constant circuit 36. The multipath detector 42 detects noise components which are received in a state in which the components are superimposed over the signal received by the antenna 12.

Figure 5:
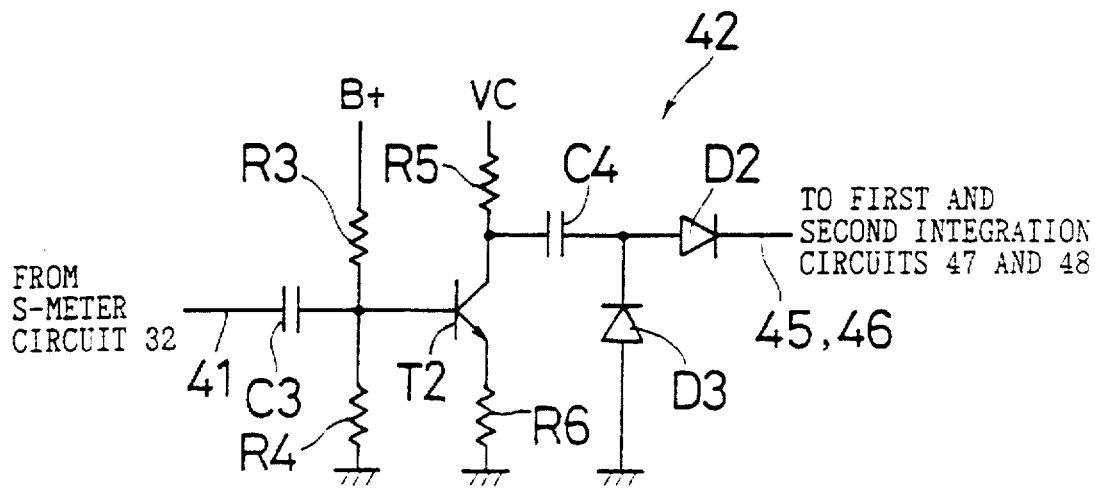
FIG. 5 is a circuit diagram showing a specific configuration of a multipath detector 42.

FIG. 5 is a circuit diagram showing a specific configuration of the multipath detector 42. The line 41 is connected to one terminal of a capacitor C3. The other terminal of the capacitor C3 is connected to terminals of one side of resistors R3 and R4, and the base of the transistor T2. The other terminal of the resistor R3 is connected to the battery so that the predetermined voltage B+ is applied to the terminal. The other terminal of the resistor R4 is grounded.

A predetermined voltage VC is applied to the collector of the transistor T2 via a resistor R5. The emitter of the transistor T2 is grounded via a resistor R6. One terminal of a capacitor C4 is connected to the emitter of the transistor T2 and the one terminal of the resistor R5. The forward input terminal of a diode D2, and the forward output terminal of a diode D3 are connected to the other terminal of the capacitor C4. The forward input terminal of the diode D3 is grounded. The forward output terminal of the diode D2 is connected to lines 45 and 46 which will be described later.

In the multipath detector 42, first, the low-frequency component of the output signal of the S-meter circuit 32 is removed by a filter consisting of the capacitor C3 and the resistor R4. The output signal from which the low-frequency component has been removed is supplied to an amplifying and rectifying circuit consisting of the resistors R3 to R5, the transistor T2, and the capacitor C4. The amplifying and rectifying circuit amplifies and rectifies the supplied output signal, thereby extracting a noise signal. Finally, the extracted noise signal is subjected to full-wave rectification by a full-wave rectification circuit consisting of the diodes D2 and D3, and the rectification result is supplied to first and second integration circuits 47 and 48.

The transistor T2 of the multipath detector 42 is easily saturated even when the level of the noise signal is low. In other words, the transistor T2 is disposed so that, even when noises contained in the output signal of the S-meter circuit 32 are low in level, the noises are extracted by the multipath detector 42. Therefore, the noise signal output from the multipath detector 42 is a signal which indicates only the presence or the absence of noises and in which the level of the noises, i.e., the level of the electric field strength of the received signal is neglected. In this way, the multipath detector 42 extracts only the noise component from the received signal.

Alternatively, multipath noises may be detected by filtering the output signal of the frequency discriminating circuit 21 to remove away the low-frequency component, amplifying and rectifying the output signal, and then performing the detection so as to extract the noise component. When an FM receiver is provided with a noise canceling circuit which removes noise components superimposed over a demodulated sound signal, for example, a filter and an amplifying and rectifying circuit which are used for detecting noises in the noise canceling circuit may be used also as a circuit for detecting multipath noises.

Figure 6:
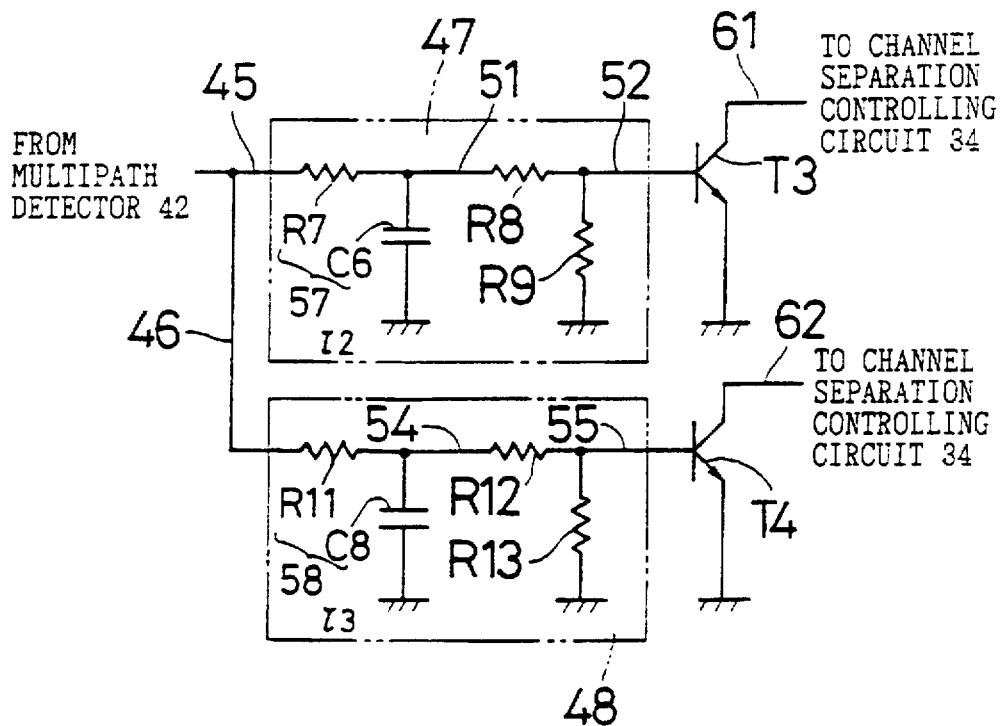
FIG. 6 is a circuit diagram showing a specific configuration of integration circuits 47 and 48, and waveshaping transistors T3 and T4.

The output of the multipath detector 42 is supplied to the first and second integration circuits 47 and 48 via the lines 45 and 46. FIG. 6 is a circuit diagram showing the specific configuration of the integration circuits 47 and 48, and waveshaping transistors T3 and T4. In the first integration circuit 47, one terminal of a resistor R7 is connected to the line 45. One terminal of a resistor R8 is connected in series to the other terminal of the resistor R7 via a line 51. A capacitor C6 is interposed between the line 51 and the ground line. The other terminal of the resistor R8 is connected to the base of the waveshaping transistor T3 via a line 52. A resistor R9 is interposed between the line 52 and the ground line.

The second integration circuit 48 has a similar configuration as that of the first integration circuit 47. The line 46, a resistor R11, a line 54, and a resistor R12 are connected in series in this sequence. A capacitor C8 is interposed between the line 54 and the ground line. The other terminal of the resistor R12 which is opposite to the one terminal connected to the resistor R11 is connected to the base of the transistor T4 via a line 55. A resistor R13 is interposed between the line 55 and the ground line.

In the first integration circuit 47, the resistor R7 and the capacitor C6 constitute a time-constant circuit 57 having a charging time constant $\tau 2$. In the second integration circuit 48, the resistor R11 and the capacitor C8 constitute a time-constant circuit 58 having a charging time constant $\tau 3$. The resistors R8 and R9 of the first integration circuit 47, and the resistors R12 and R13 of second integration circuit 48 are resistors for adjusting the discharging time constants of the integration circuits 47 and 48.

The charging time constant of each of the time-constant circuits 57 and 58 can be obtained by the multiplication of the resistance of the resistors and the electrostatic capacitance of the capacitor. Hereinafter, the resistance of a resistor Rn (where n is an integer) is indicated by "rn," and the electrostatic capacitance of a capacitor Cn (where n is an integer) is indicated by "cn." The time constants $\tau 2$ and $\tau 3$ are indicated by the following expressions:

$$\tau 2 = r7 \cdot c6 \tag{1}$$

$$\tau 3 = r11 \cdot c8 \tag{2}$$

The time constant $\tau 2$ of the time-constant circuit 57 is set to be larger than the time constant $\tau 3$ of the time-constant circuit 58.

$$\tau 2 > \tau 3 \tag{3}$$

The discharging time constants $\tau 2a$ and $\tau 3a$ of the integration circuits 47 and 48 are indicated by the following expressions:

$$\tau 2a = (r8 + r9) \cdot c6 \tag{4}$$

$$\tau 3a = (r12 + r13) \cdot c8 \tag{5}$$

The discharging time constant $\tau 2a$ of the first integration circuit 47 is larger than the discharging time constant $\tau 3a$ of the second integration circuit 48. The charging time constants $\tau 2$ and $\tau 3$ are larger than the discharging time constants $\tau 2a$ and $\tau 3a$, respectively. In the first integration circuit 47, for example, the charging time constant $\tau 2$ is set to be 3 milliseconds and the discharging time constant $\tau 2a$ to be 0.3 milliseconds.

As described above, the bases of the waveshaping transistors T3 and T4 are connected to the first and second integration circuits 47 and 48, respectively. The emitters of the transistors T3 and T4 are grounded. The collectors of the transistors T3 and T4 are connected to the channel separation controlling circuit 34 via lines 61 and 62 as described later.

In the first and second integration circuits 47 and 48, the capacitors C6 and C8 are charged by the pulse-like noise signal supplied from the multipath detector 42. When the capacitors C6 and C8 are charged to a predetermined voltage level, the transistors T3 and T4 are turned on so that currents flow from the emitters of the transistors T3 and T4 to the collectors.

Referring again to FIG. 1, the channel separation controlling circuit 34 comprises resistors R15 to R18, diodes D6 and D7, and a capacitor C10. The S-meter circuit 32 is connected to one terminal of the resistor R15 via the line 33, the time-constant circuit 36, and the line portion 35. The resistors R15 to R18 are connected in series in this sequence between the line portion 35 and the ground line.

One forward input terminal P2 of the diode D6 is connected to the other terminal of the resistor R15 and one terminal of the resistor R16. A capacitor C10 is interposed between the other terminal P1 on the output side in the forward direction of the diode D6 and the ground line. The collector of the transistor T3 is connected via a line 51 to the junction of the other terminal P1 of the diode D6 and the capacitor C10.

One forward input terminal P4 of the diode D7 is connected to the other terminal of the resistor R16 and one terminal of the resistor R17. The other forward output terminal P3 of the diode D7 is connected to the emitter of the transistor T4 via the line 62. The other terminal of the resistor R17 is connected to one terminal of the resistor R18 and a line 63. The resistor R18 is interposed between the line 63 and the ground line.

Figure 7:
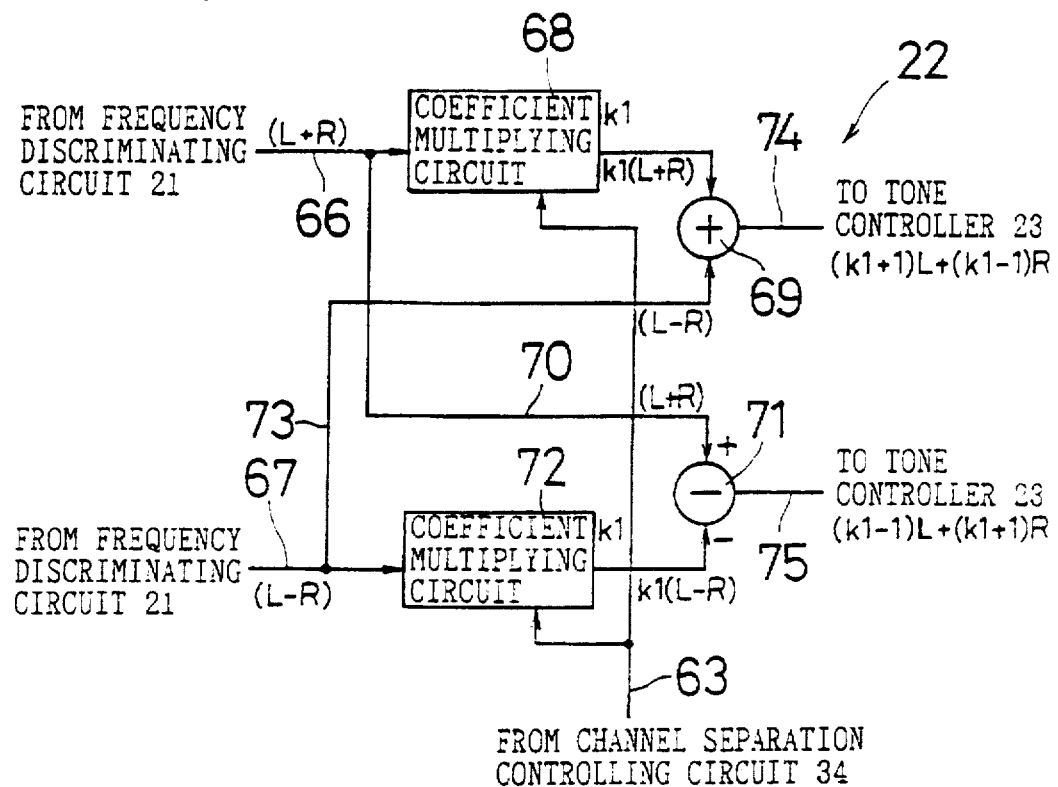
FIG. 7 is a block diagram showing the specific configuration of a channel separating circuit 22.

FIG. 7 is a block diagram showing a specific configuration of the channel separating circuit 22. The channel separating circuit 22 separates sound signals of right and left channels from the received signal which has been demodulated by the frequency discriminating circuit 21. The channel separation refers to a degree whereby a signal of the left or right channel leaks to the right or left channel to be mixed with a signal of the right or left channel. The channel separation is indicated by the following expression:

[Mathematical Expression 1]

$$\text{Separation Degree} = 20 \cdot \log_{10} \frac{R}{\Delta R} = 20 \cdot \log_{10} \frac{L}{\Delta L} \quad (6)$$

In the Mathematical Expression 1, "R" and "L" indicate sound signals of the right and left channels, and "$\Delta R$" and "$\Delta L$" indicate a sound signal of the right channel which leaks to the left channel, and that of the left channel which leaks to the right channel, respectively.

The frequency discriminating circuit 21 supplies a sum signal (L+R) in which the sound signals of right and left channels are added to each other, to the channel separating circuit 22 via a line 66, and also a difference signal (L−R) in which the sound signal of the right channel is subtracted from that of the left channel, to the channel separating circuit 22 via a line 67.

The sum signal (L+R) is multiplied by a coefficient k1 in a coefficient multiplying circuit 68, and then supplied to an adder 69. Besides, the sum signal (L+R) is supplied as it is to a subtracter 71 via a line 70.

The difference signal (L−R) is multiplied by a coefficient k1 in a coefficient multiplying circuit 72, and then supplied to the subtracter 71. The difference signal (L−R) is supplied as it is to the adder 69 via a line 73.

The coefficient multiplying circuits 68 and 72 are connected to the channel separation controlling circuit 34 via a line 63 and controlled by the circuit 34. Specifically, the coefficient multiplying circuits 68 and 72 determine the value of the coefficient k1 in accordance with the control voltage from the channel separation controlling circuit 34, and multiply the coefficient with the difference and sum signals.

In the adder 69, the sum signal [k1(L+R)] obtained by multiplying the coefficient k1 is added to the difference signal (L−R), and the output is supplied to the tone controller 23 via a line 74. In the subtracter 71, the difference signal [k1(L−R)] obtained by multiplying the coefficient k1 is subtracted from the sum signal (L+R), and the output is supplied to the tone controller 23 via a line 75. In other words, via the lines 74 and 75 the tone controller 23 is supplied with the following signals:

$$(k1+1)L+(k1-1)R \quad (7)$$

$$(k1-1)L+(k1+1)R \quad (8)$$

Figure 8:
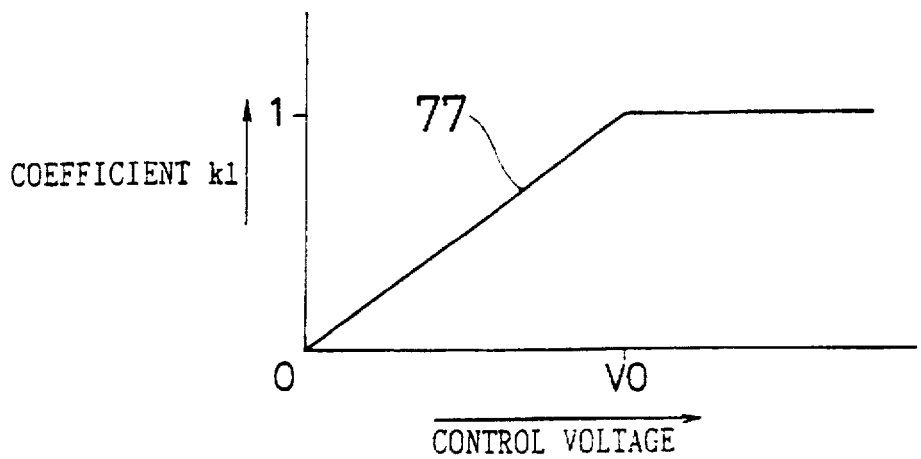
FIG. 8 is a graph showing relationships between a coefficient k1 determined by coefficient multiplying circuits 68 and 72 and a control voltage.

In the expressions, "R" and "L" indicate the sound signals of the right and left channels. The coefficient k1 is a value which is determined in proportion to the control voltage supplied from the channel separation controlling circuit 34 via the line 63, and corresponds to the channel separation. FIG. 8 is a graph showing relationships between the coefficient k1 and the control voltage. As shown by the curve 77, the coefficient k1 is increased in proportion to the control voltage during the period when the control voltage is in the range of 0 to V0. When the control voltage is raised so as to be higher than a predetermined voltage V0, the coefficient k1 is kept to be 1. The coefficient k1 has a value in the range of 0 to 1.

From the expressions (7) and (8), the following facts will be made clear. When the coefficient k1 is 1, only the sound signals of the left and right channels are output via the lines 74 and 75, respectively. When the coefficient k1 is 0, a signal which is obtained by subtracting the sound signal of the right channel from that of the left channel is output via the line 74, and a signal which is obtained by subtracting the sound signal of the left channel from that of the right channel is output via the line 75. When the coefficient k1 is larger than 0 and smaller than 1, signals to which the sound signals of the right and left channels are mixed at a proportion corresponding to the coefficient are output into the left and right channels.

In the stereo receiver 11 having the above-described circuit configuration, when multipath noises are not generated, the coefficient multiplying circuits 68 and 72 of the channel separating circuit 22 are controlled in accordance with the output of the S-meter circuit 32. When multipath noises are generated, the values of the coefficients k1 of the coefficient multiplying circuits 68 and 72 are controlled on the basis of the number of multipath noises which are generated in a predetermined period, i.e., the noise density. This control technique will be described in detail below.

Figure 9:
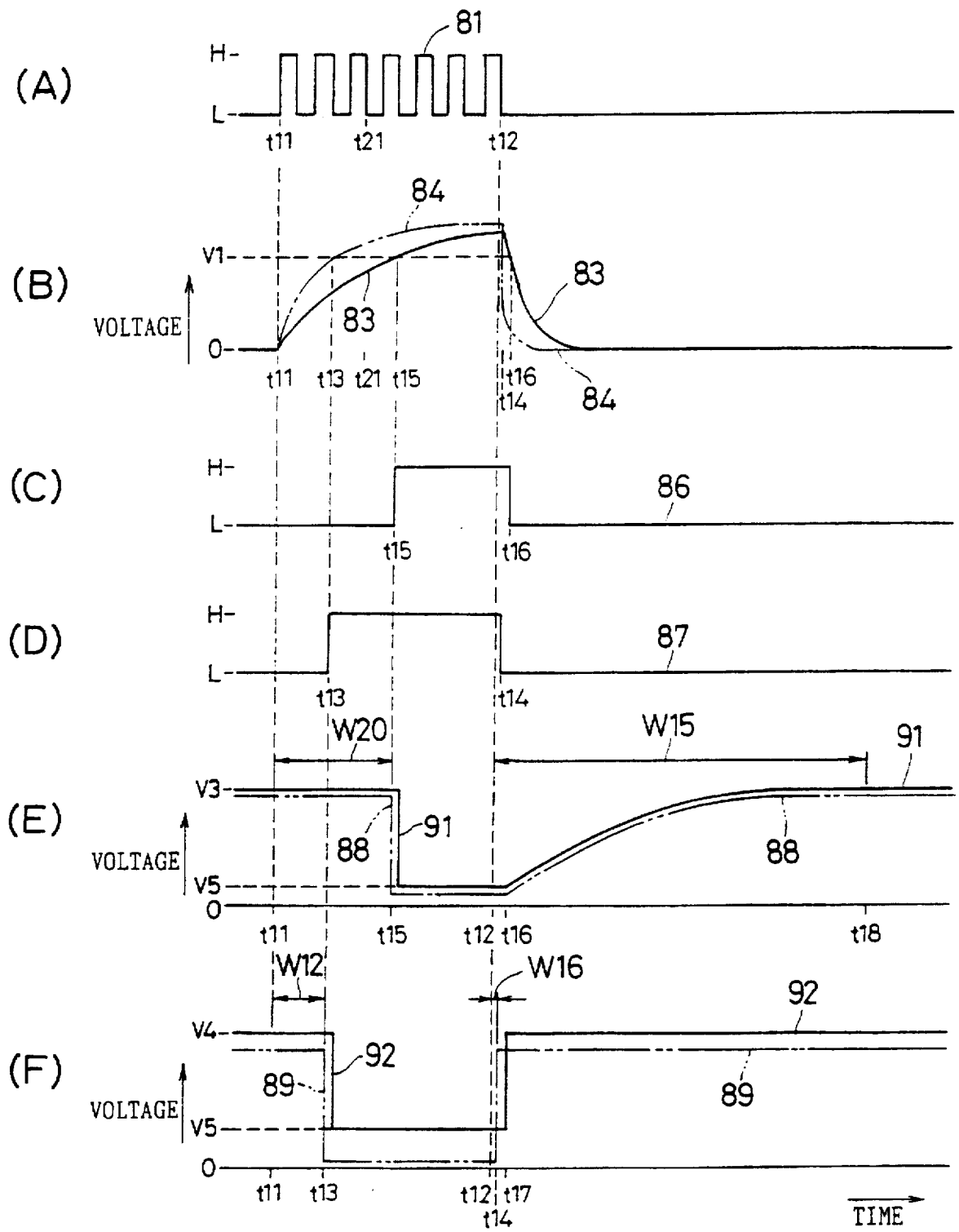
FIG. 9 is a waveform chart showing outputs of circuits ranging from the multipath detector 42 to a channel separation controlling circuit 34.

FIG. 9 is a waveform chart showing outputs of each of the circuits ranging from the multipath detector 42 to the channel separation controlling circuit 34. The curve 81 of FIG. 9A indicates the noise signal output from the multipath detector 42. The noise signal is a pulse signal indicative of the presence or the absence of noise components.

FIG. 9B shows the levels of the output signals of the first and the second integration circuits 47 and 48. The curve 83 indicates the level of the output signal of the first integration circuit 47, and the curve 84 the level of the output signal of the second integration circuit 48.

When the multipath detector 42 detects that noises are superimposed over the received signal, the multipath detector 42 switches the level of the noise signal from the low level to the high level.

The capacitors C6 and C8 of the first and second integration circuits 47 and 48 start the charging operation at the time when noises begin to be detected in the multipath detector 42, i.e., time t11 when the initial pulse of the noise signal of FIG. 9A rises. The capacitors C6 and C8 end the charging operation at the time when noises become undetectable in the multipath detector 42, i.e., time t12 when the last pulse of the noise signal of FIG. 9A falls, and then transfer to the discharging operation.

The charging time constant τ3 of the second integration circuit 48 is smaller than the charging time constant τ2 of the first integration circuit 47. Therefore, the output level of the output signal of the second integration circuit 48 is increased more rapidly than that of the output signal of the first integration circuit 47. The output level of the second integration circuit 48 reaches the predetermined on-voltage V1 at time t13. The output level of the first integration circuit 47 reaches the on-voltage V1 at time t15 which is later than time t13. The discharging time constant τ3a of the second integration circuit 48 is smaller than the discharging time constant τ2a of the first integration circuit 47. Consequently, when the capacitors C6 and C8 of the integration circuits 47 and 48 transfer to the discharging operation at time t12, the output level of the second integration circuit 48 is reduced more rapidly than that of the first integration circuit 47. The output levels of the second and first integration circuits 48 and 47 are reduced in this sequence to a level lower than the on-voltage V1 at times t14 and t16, respectively.

Therefore, the output level from the second integration circuit 48 is maintained to a level of the on-voltage V1 or higher during the period from time t13 to time t14. The output level from the first integration circuit 47 is maintained to a level of the on-voltage V1 or higher during the period from time t15 to t16.

Times t14 and t16 when the output levels of the second and first integration circuits 48 and 47 are switched from a level of the on-voltage V1 or higher to that lower than the on-voltage V1 are later than time t12 when noises are not detected. Furthermore, the switching time t14 of the output level of the second integration circuit 48 is faster than the switching time t16 of the output level of the first integration circuit 47, and substantially equal to time t12 when noises are not detected.

FIGS. 9C and 9D are waveform charts showing switching timings between the off-state to the on-state of the transistors T3 and T4. The curve 86 of FIG. 9C shows the switching timing between the off-state to the on-state of the transistor T3, and the curve 87 of FIG. 9D shows the switching timing between the off-state to the on-state of the transistor T4. In FIGS. 9C and 9D, it is assumed that, when the level is low, the transistors are turned off, and, when the level is high, the transistors are turned on.

When the output levels of the first and second integration circuits 47 and 48 are not lower than the on-voltage V1, the transistors T3 and T4 maintain the on-state in which currents are allowed to pass therethrough. When the output levels are lower than the on-voltage V1, the transistors T3 and T4 maintain the off-state in which currents are not allowed to pass therethrough.

The switching operations of the transistors T3 and T4 between the on-state and the off-state correspond to the output levels of the first and the second integration circuits 47 and 48. Specifically, when the output level of the first integration circuit 47 is switched at time t15 from a level lower than the on-voltage V1 to that not lower than the on-voltage V1, the transistor T3 is switched at time t15 from the off-state to the on-state. During the period from time t15 to time t16, the transistor T3 maintains the on-state. When the output level of the first integration circuit 47 is switched at time t16 from a level not lower than the on-voltage V1 to that lower than the on-voltage V1, the transistor T3 is switched from the on-state to the off-state.

Similarly, when the output level of the second integration circuit 48 is switched at time t13 from a level lower than the on-voltage V1 to that not lower than the on-voltage V1, the transistor T4 is switched from the off-state to the on-state. During the period from time t13 to time t14, the transistor T4 maintains the on-state. When the output level of the second integration circuit 48 is switched at time t14 from a level not lower than the on-voltage V1 to that lower than the on-voltage V1, the transistor T4 is switched from the on-state to the off-state. Namely, the timings of the transistor T3 switching from the off-state to the on-state and vice versa are later than those of the transistor T4. When the transistors T3 and T4 are turned on, a forward current flows through the diodes D6 and D7 in the channel separation controlling circuit 34.

FIG. 9E is a chart showing the voltage levels at the forward output terminal P1 and the forward input terminal P2 of the diode D6. FIG. 9F is a waveform chart showing the voltage levels at the forward output terminal P3 and the forward input terminal P4 of the diode D7. The curves 88 and 89 of FIGS. 9E and 9F respectively show the voltage levels at the terminals P1 and P3 of the diodes D6 and D7, and the curves 91 and 92 of FIGS. 9E and 9F respectively show the voltage levels at the other terminals P2 and P4 of the diodes D6 and D7.

When noises are not detected, voltage V3 and V4 which are obtained by dividing the S-meter voltage from the S-meter circuit 32 by the resistors R15 to R18 are applied to the other terminals P2 and P4.

When the transistor T3 is turned on at time t15, the voltage level of the one terminal P1 is lowered to, for example, the vicinity of 0 V so that the state where a current can flow through the diode D6 is attained. When the transistor T3 is switched at time t16 from the on-state to the off-state, the voltage level of the one terminal P1 is disposed to return to the level attained in a state where noises are not superimposed. At this timing, the capacitor C10 connected to the one terminal P1 begins to discharge. Therefore, the voltage level of the one terminal P1 is gradually increased as the discharging operation of the capacitor C10 proceeds, and is returned at time t17 to the original value.

The voltage level of the other terminal P2 of the diode D6 is changed in response to the change of the voltage level of the one terminal P1 and without substantial delay. Therefore, the voltage level of the other terminal P2 is forcedly lowered at time t15 from the voltage level V3 obtained by the division of the S-meter voltage, to a predetermined voltage level V5 which is determined by the forward voltage of the diode D6. When the transistor T3 is turned off at time t16, or when it is judged that noises are not detected in the first integration circuit 47, the voltage level of the other terminal P2 is gradually increased as the discharging operation of the capacitor C10 advances.

When the transistor T4 is switched to the on-state, the voltage level of the one terminal P3 of the diode D7 is lowered to a level in the vicinity of 0V without a substantial delay. When the voltage level of the one terminal P3 is lowered to a level in the vicinity of 0 V, the state where a current can flow through the diode D7 is attained. Therefore, the voltage level of the other terminal P4 of the diode D7 is forcedly lowered from the voltage level V4 obtained by dividing the S-meter voltage, to the voltage V5 which is determined by the forward voltage of the diode D7, and restricted thereby. When the transistor T4 is switched from the on-state to the off-state, the voltage level of the one terminal P3 is returned to the original level. This causes the forward current of the diode D7 not to flow therethrough, with the result that the voltage level of the other terminal P4 is immediately returned to the voltage level V4 obtained by dividing the S-meter voltage.

In this way, the voltage level of the other terminal P2 of the diode D6 is controlled by the output level of the first integration circuit 47. At the same time, the voltage level of the junction which is between the resistors R15 and R16 of the channel separation controlling circuit 34 and which is connected to the other terminal P2 is controlled. In addition, the voltage level of the junction which is between the other terminal P4 of the diode D7 and the resistors R16 and R17 is controlled by the output level of the second integration circuit 48 in the similar manner. The control timing is determined in accordance with the time constants of the first and second integration circuits 47 and 48.

As a result, the control voltage which is to be supplied to the coefficient multiplying circuits 68 and 72 of the channel separating circuit 22 is controlled in accordance with the presence or the absence of multipath noises and the occurrence number of multipath noises in a predetermined time period, i.e., the noise density. The controlling operation will be described in detail below.

When multipath noises are not detected, the output level of the multipath detector 42 is always kept to be low. Therefore, the output levels of the first and second integration circuits 47 and 48 do not reach the on-voltage V1 and the transistors T3 and T4 maintain the off-state. This causes the voltage levels of the other terminals P2 and P4 of the diodes D6 and D7 to be kept to the levels V3 and V4 which are restricted by the S-meter voltage. Accordingly, the voltage level V11 of the S-meter voltage is divided by the resistors R15 to R18, converted into the control voltage of a voltage level V12a, and then supplied to the coefficient multiplying circuits 68 and 72 of the channel separating circuit 22 via the line 63.

[Mathematical Expression 2]

$$V12a = \frac{r18}{r15 + r16 + r17 + r18} \cdot V11 \qquad (9)$$

Consequently, in the channel separating circuit 22, when the sensitivity of the received signal is high or the voltage level V11 of the S-meter voltage is high corresponding to the electric field strength of the received signal, the channel separation is set to be the maximum one which can be set in the channel separating circuit 22. When the sensitivity of the received signal is lowered, the voltage level V11 of the S-meter voltage is lowered and the channel separating circuit 22 reduces the channel separation so as to correspond to the supplied control signal.

When multipath noises are generated, the multipath detector 42 detects only the presence or the absence of multipath noises irrespective of the level of the multipath noises. When multipath noises are detected, the pulse signal which is high when multipath noises are generated is supplied to the first and second integration circuits 47 and 48.

When the density of multipath noises is low, i.e., when the number of multipath noises in a predetermined period is small or the intervals of single multipath noises are large, only the output level of the second integration circuit 48 reaches the on-voltage V1 and that of the first integration circuit 47 fails to reach the on-voltage V1.

For example, suppose that multipath noises are generated during a period from time t11 to time t21 and multipath noises are not generated during a period from time t21 to time t12 in FIG. 9 described above. In this case, since the time constant τ2 of the first integration circuit 47 is larger than the time constant τ3 of the second integration circuit 48, the output level of the first integration circuit 47 does not reach the on-voltage V1, and only the output level of the second integration circuit 48 reaches the on-voltage V1. Consequently, the transistor T3 is kept in the off-state and the transistor T4 is switched to the on-state.

As a result, since no current flows through the diode D6 in the channel separation controlling circuit 34, the voltage level of the other terminal P2 is maintained to the voltage level V3 defined by the S-meter voltage. Since the transistor T4 is switched to the on-state, the voltage level of the one terminal P3 of the diode D7 is lowered to the vicinity of 0 V so that the forward current flows through the diode D7. Irrespective of the S-meter voltage, therefore, the voltage level of the other terminal P4 of the diode D7 is maintained to the voltage level V5 which is defined by the forward voltage of the diode D7. Therefore, a control voltage V12b output from the channel separation controlling circuit 34 is indicated by the following expression:

[Mathematical Expression 3]

$$V12b = \frac{r18}{r17 + r18} \cdot V5 \qquad (10)$$

The control voltage V12b controls the channel separation of the channel separating circuit 22 so as to be about 10 dB.

The resistances r17 and r18 of the resistors R17 and R18 are determined so that the voltage level V5 which is defined by the forward voltage of the diode D7 is converted to the control voltage V12b.

Besides, when time t12 is past and the generation of multipath noises ceases, the transistor T4 is switched from the on-state to the off-state and the forward current does not flow through the diode D7. As a result, the voltage level of the other terminal P4 is instantly returned to the level V5 which is defined by the S-meter voltage.

Figure 10A:
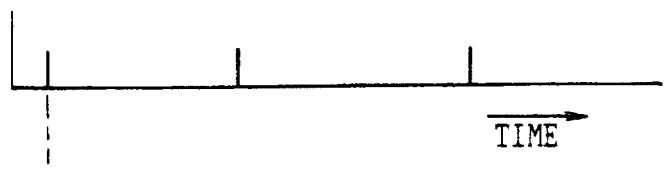
FIGS. 10A and 10B are graphs showing relationships between generation timings of noises and a change in the channel separation in the case where the noise density is low.
Figure 10B:
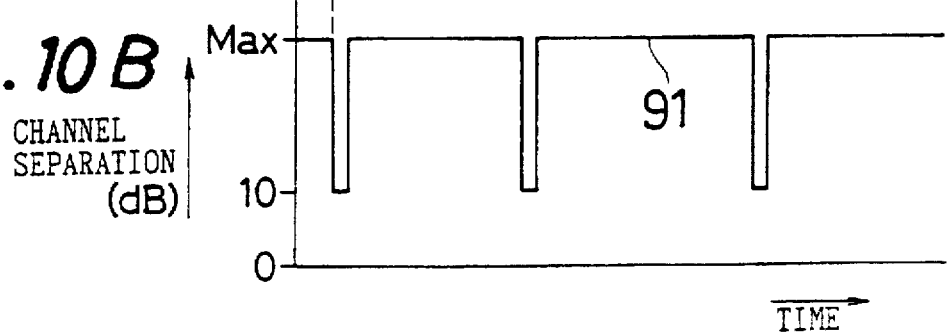
Figure 11A:
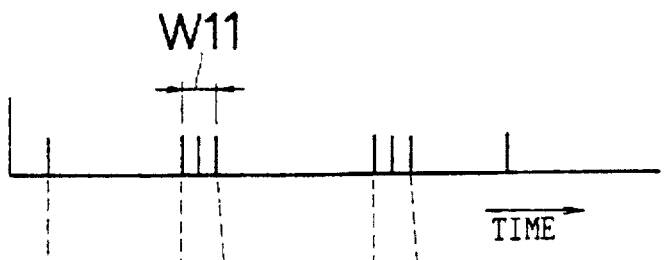
FIGS. 11A and 11B are graphs showing relationships between generation timings of noises and a change in the channel separation in the case where the noise density is medium.
Figure 11B:
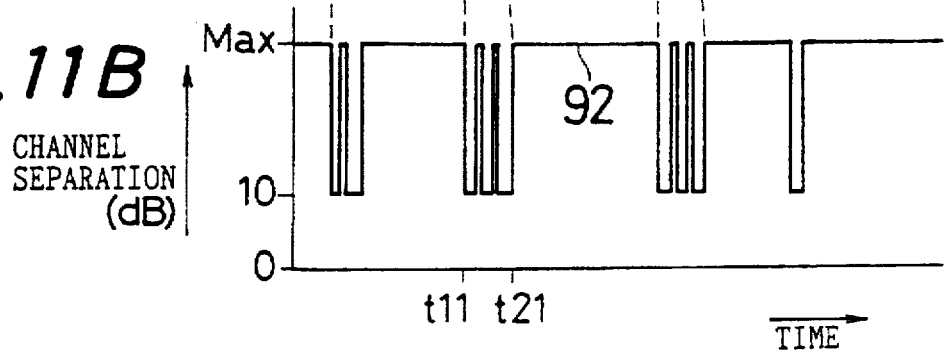

When multipath noises are singly generated at long intervals as shown in FIG. 10A, or when the noise density of multipath noises is low or at the degree in which several multipath noises are generated in a period W11 as shown in FIG. 11A, noises can be sufficiently reduced by lowering the channel separation to 10 dB. The period W11 is 2 to 3 milliseconds. In this case, as shown in FIGS. 10B and 11B, when noises are generated, the channel separation is instantly lowered from the maximum value Max to about 10 dB. When noises are not detected, the channel separation is instantly returned from about 10 dB to the maximum value Max.

When the channel separation is lowered to 10 dB, the listener who listens to the stereophonic broadcasting reproduced by the stereo receiver 11 does not feel a large change in the stereophonic sense such as that the sound signals of the right-channel and the left-channel are mixed with the sound signal of the opposite channel and the reproduced sound becomes closer to the monophonic sound, and hence the listener does not feel the so-called sound fluctuation and the like.

Consequently, when a single multipath noise or multipath noises of a low noise density are generated, the channel separation is lowered to about 10 dB, and, when generation of noises ceases, the channel separation is returned substantially instantly, whereby the period when the channel separation is lowered can be shortened. Accordingly, multipath noises can be reduced without causing the listener to feel the sound fluctuation and the like, and the period of providing the stereophonic broadcasting can be prolonged.

When the density of multipath noises is high, the multipath detector 42 supplies the noise signal of the detection of the plurality of noises in the period from time t11 to time t12 as shown in FIG. 9A, to the first and second integration circuits 47 and 48.

In this case, only the second integration circuit 48 reaches the on-voltage V1 at time t13, and hence the transistor T4 is turned on at time t13 so that the forward current flows through the diode D7 and the voltage level of the other terminal P4 is defined to the level V5. Consequently, irrespective of the voltage level of the output of the S-meter circuit 32, the control voltage V12b is supplied to the channel separating circuit 22.

Thereafter, the output of the first integration circuit 47 reaches the on-voltage V1 at time t15, and hence the transistor T3 is turned on so that the forward current flows through the diode D6 and the voltage level of the other terminal P2 is defined to the level V5. At this time, the voltage level of the other terminal P4 of the diode D7 is defined to a level lower than the voltage level of the other terminal P2 of the diode D6. Therefore, the control voltage V12c which is supplied to the channel separating circuit 22 at this time is defined by the following expression:

[Mathematical Expression 4]

$$V12c = \frac{r18}{r16 + r17 + r18} \cdot V5 \quad (11)$$

The control voltage V12c is a level for controlling the channel separating circuit 22 so that, for example, the channel separation becomes 4 dB or less. When the channel separation is reduced to 4 dB or less, the ability of reducing noises by controlling the channel separation by means of the channel separating circuit 22 is maximized. In addition, when the channel separation is reduced to 4 dB or less, the listener cannot auditorily feel that sounds of the right and left channels are separated. In the case where the channel separation is reduced to 4 dB or less, a sense of the sound fluctuation in which the listener feels the switching of the monophonic sound and the stereophonic sound may be produced by returning the channel separation to the original maximum value Max. In this case, therefore, the channel separation is gradually increased with a lapse of time.

When noises are not detected after time t12, the first and second integration circuits 47 and 48 start the discharging operation at time t12. Since the discharging time constant τ2a of the first integration circuit 47 is larger than the discharging time constant τ3a of the second integration circuit 48, the discharging operation in the first integration circuit 47 proceeds more slowly than the discharging operation of the second integration circuit 48 does. When the first and second integration circuits 47 and 48 start the discharging operation at time 12, therefore, the output level of the second integration circuit 48 reaches the on-voltage V1 earlier than that of the first integration circuit 47. As a result, the transistor T4 is switched from the on-state to the off-state earlier than the transistor T3.

When the transistor T4 is switched from the on-state to the off-state at time t14, the transistor T3 remains in the on-state. Irrespective of whether the forward current flows through the diode D7 or not, therefore, the control voltage supplied to the channel separating circuit 22 is defined only by the voltage level of the other terminal P2 of the diode D6. Therefore, the returning operation of the channel separation is controlled by the discharging time constant τ2a of the first integration circuit 47 and the electrostatic capacitance c10 of the capacitor C10.

When the output level of the first integration circuit 47 reaches at time t16 the on-voltage V1 or lower, the transistor T3 is switched from the on-state to the off-state. When the transistor T3 is switched to the off-state, the voltage level of the one terminal P1 of the diode D6 is defined by the discharging of the capacitor C10 as described above. Consequently, the release time W15 is very much longer than the release time W16 in the case where the noise density is low. The release times W15 and W16 are time periods from time t12 when noises are not detected, to times t18 and t14 when the voltage levels of the one terminals P2 and P4 of the diodes D6 and D7 is returned to the level V3 defined by the S-meter voltage, respectively. The release time W15 in the case where the noise density is high is set to be a period not shorter than 1 second, for example, 2 seconds.

Consequently, in the case of a high noise density, such as that where many multipath noises are generated for a predetermined period W18 as shown in FIG. 12A, the channel separation is first reduced from the maximum value Max to about 10 dB immediately after noises begin to be detected as shown in FIG. 12B. When the output level of the second integration circuit 47 reaches the on-voltage V1 at time t15, the channel separation is further lowered to 4 dB or lower. When the detection of noises ceases at time t12, the channel separation is gradually increased at the time-change rate which is controlled by the discharging of the capacitor C10, and, after an elapse of the predetermined release time W15, the channel separation is returned to the maximum channel separation Max. In this way, when the noise density is high, the channel separation is lowered to the vicinity of 0 dB, and, when noises begin not to be detected, the channel separation is gradually returned to the original value with a lapse of time. For example, the period W18 is several hundreds milliseconds. When many multipath noises are detected during several hundreds milliseconds, it is judged that the noise density is high.

As described above, in the stereo receiver 11 of the embodiment, the channel separation is controlled in accordance with the three conditions, when multipath noises are not detected, when multipath noises are detected and the noise density is low, and when multipath noises are detected and the noise density is high.

In the stereo receiver 11 of the embodiment, it is judged whether the density of multipath noises is higher than a predetermined level or not, on the basis of a judgment of whether the outputs of the two integration circuits having different time constants reach the predetermined voltage level or not. That is, when the noise density is low, only the output level of the second integration circuit 48 having a smaller time constant reaches the on-voltage V1, and that of the first integration circuit 47 having a larger time constant does not reach the on-voltage V1. In this case, it is judged that the noise density is low, and the channel separation is defined to be 10 dB. Subsequently, when the output level of the first integration circuit 47 reaches the on-voltage V1, it is judged that the noise density is high, and the channel separation is defined to be 4 dB or less.

Preferably, when noises are to be reduced, the channel separation is lowered immediately after multipath noises are detected. The transistors T3 and T4 constitute the circuit for judging whether the noise density is not lower than the predetermined density or not. A period W20 which elapses until the output level of the first integration circuit 47 reaches the on-voltage V1 is longer than a period W12 which elapses until the output level of the second integration circuit 48 reaches the on-voltage V1. Consequently, when multipath noises are generated, the channel separation is lowered to 10 dB after an elapse of the period W12 starting from the time when noises are detected, irrespective of the level of the multipath noises. Thereafter, the judgment on whether the channel separation is to be further lowered or not is passed in accordance with the noise density.

When integration circuits having different time constants are operated in parallel, the integration circuits sequentially output a signal of a level at which a transistor can be turned on, in the order of circuits of a smaller time constant. Consequently, when simple circuits such as integration circuits are operated in parallel, the attack time, i.e., the time period from the generation of noises to the lowering of the channel separation can be defined by an integration circuit having the smallest time constant, with the result that the attack time can always be defined to be short. The attack time of the stereo receiver 11 is defined as the period from the noise detection time t11 to the time when the output level of the second integration circuit 48 reaches the on-voltage V1. In other words, the attack time is shorter as the time constant of the second integration circuit 48 is larger.

FIG. 13 is a view showing relationships between the S-meter voltage and the channel separation in the stereo receiver 11 according to the embodiment. When multipath noises are not generated, as indicated by the solid line 101, the channel separation is increased as the S-meter voltage is raised. In other words, during a period when the electric field strength of the received signal is not lower than a predetermined level, sound signals of the right and left channels are separated at the maximum channel separation Max. When the electric field strength is lowered to a level of a predetermined voltage or less, the channel separation is lowered in accordance with the S-meter voltage.

When multipath noises are generated, the channel separation is kept to be a value indicated by the solid lines 102 and 103 irrespective of the S-meter voltage. When the noise density is higher than a predetermined density, for example, the channel separation is kept to be 4 dB or less as indicated by the solid line 103. When the noise density is lower than the predetermined density, the channel separation is kept to be about 10 dB or less as indicated by the solid line 102.

Figure 14:
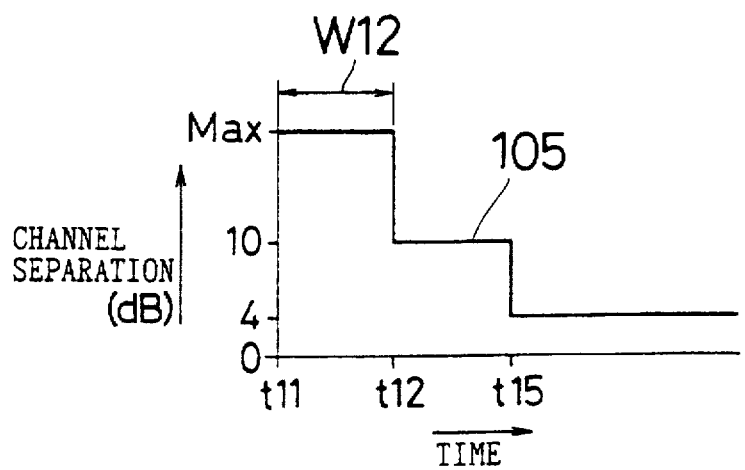
FIG. 14 is a graph showing relationships between the channel separation and a time period elapsed in the case where the noise density is higher than a predetermined density.

Furthermore, FIG. 14 is a graph showing relationships between the channel separation and a time period elapsed in the case where the noise density is higher than a predetermined density. As shown by the solid line 105, when the period W12 elapses after the detection of noises, the channel separation is lowered at time t12 from the maximum value Max to 10 dB. When the process time then reaches from time t12 to time t15, the channel separation is further reduced from 10 dB to 4 dB. Therefore, the above-mentioned attack time is always defined by the output level of the second integration circuit 48 having a smaller time constant. In the graph, the attack time is equal to the period W12.

Figure 15:
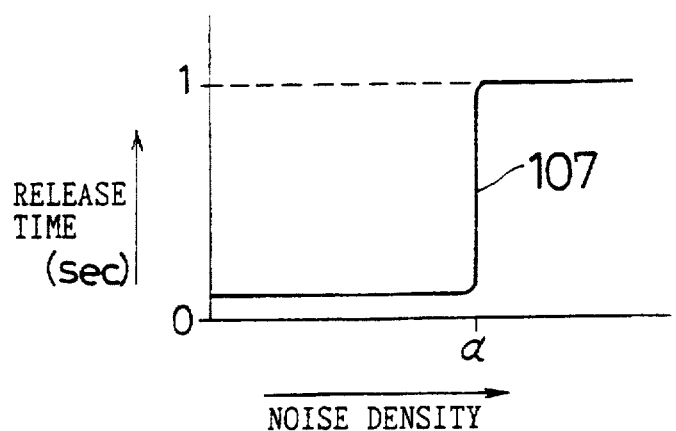
FIG. 15 is a graph showing relationships between the noise density and the release time.

FIG. 15 is a graph showing relationships between the noise density and the release time. As described above, when the channel separation is lowered from the maximum value Max to 10 dB, the listener does not feel that the sense of the stereophonic sound is impaired. When the channel separation is lowered to 10 dB, or when the noise density does not reach a predetermined density α, therefore, the release time can be set to be very short. In the case where the noise density is not lower than the predetermined density α, the channel separation is lowered to 4 dB. In this case, the listener feels that the mode is switched from the stereophonic broadcast to the monophonic broadcast. In order to prevent the listener from feeling that the mode is suddenly switched from the stereophonic broadcast to the monophonic broadcast and the sound fluctuation occurs, therefore, the release time is set to be a longer period or 1 second or longer.

As described above, in the stereo receiver 11 according to the embodiment, an extent to which the channel separation of the stereophonic broadcast is lowered is defined in accordance with the presence or the absence of multipath noises and the level of the density of multipath noises. The release time for returning the channel separation to the original maximum value is determined in accordance with the level by which the channel separation is lowered.

In the stereo receiver 11 according to the embodiment, the channel separation is lowered in a plurality of steps in response to the noise density. When the noise density is lower than the density α, it is preferable to lower the channel separation to a value between the maximum value Max and 10 dB. In the case where the channel separation is lowered to a value between the maximum value and 10 dB, the listener does not feel the above-mentioned sound fluctuation due to the lowering of the channel separation. In this case, even when the channel separation is rapidly returned to the original maximum value for a short period, therefore, the sense of incongruity due to the sudden switching of the monophonic sound and the stereophonic sound is not produced.

When the noise density is not lower than the density α, it is preferable to lower the channel separation to 4 dB or less at which the ability of reducing noises is maximized. In this case, the listener feels that sound signals of the right channel and the left channel are mixed with the sound signal of the opposite channel, and listens to the stereophonic broadcast in conditions similar to the monophonic broadcast. In such a case, the channel separation is gradually raised with expending a long period, thereby preventing the sense of the sound fluctuation due to the sudden switching of the monophonic sound and the stereophonic sound from being produced.

Figure 16:
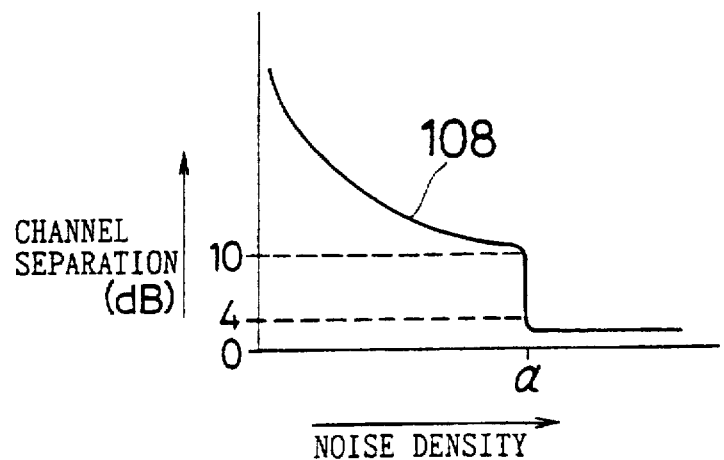
FIG. 16 is a graph showing relationships between the noise density and the channel separation.
Figure 17A:
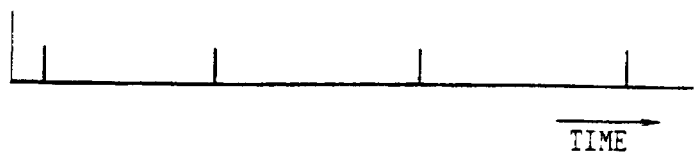
FIGS. 17A and 17B are graphs showing relationships in a prior art stereo receiver between generation timings of noises and a change in the channel separation in the case where the noise density is low.
Figure 17B:
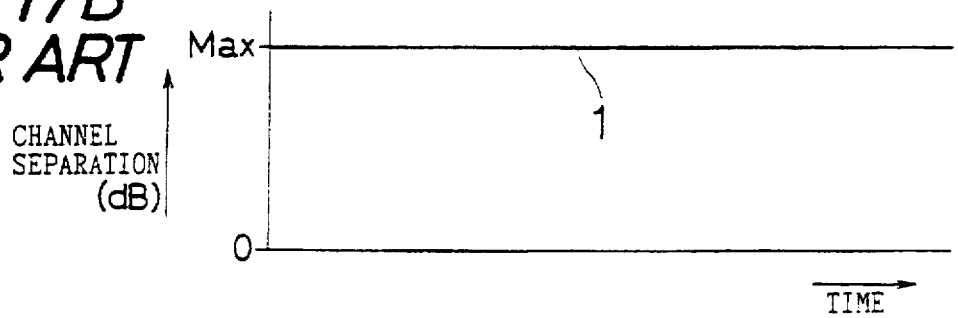
Figure 18A:
FIGS. 18A and 18B are graphs showing relationships in the prior art stereo receiver between generation timings of noises and a change in the channel separation in the case where the noise density is medium.
Figure 18B:
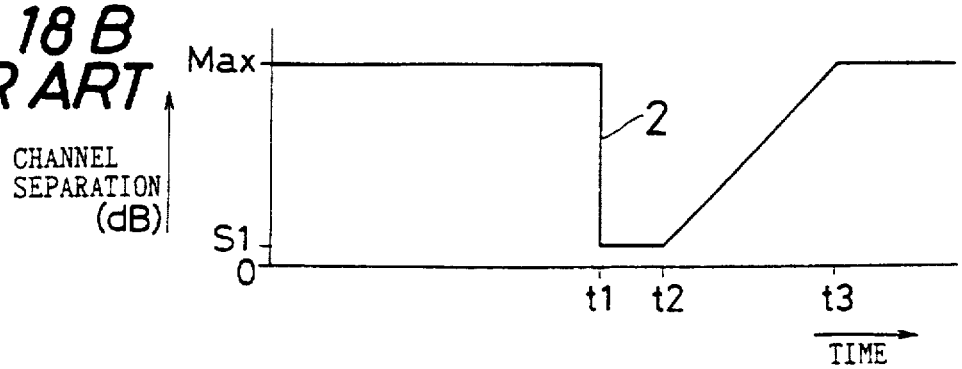
Figure 19A:
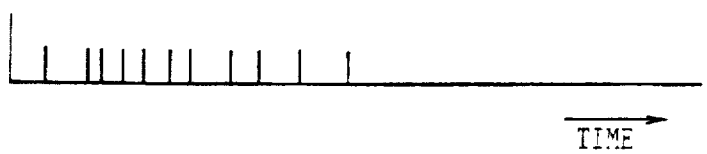
FIGS. 19A and 19B are graphs showing relationships in the prior art stereo receiver between generation timings of noises and a change in the channel separation in the case where the noise density is high.
Figure 19B:
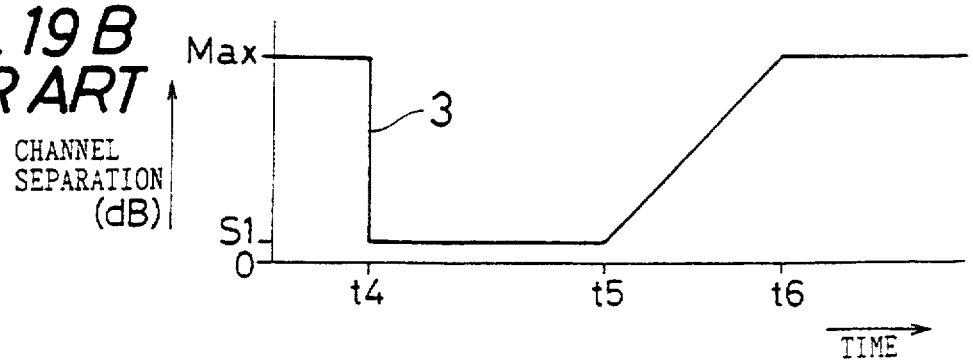

Furthermore, in another embodiment, as shown by the curve 108 of FIG. 16, the channel separation is gradually continuously changed from the maximum value Max to 10 dB in accordance with the noise density until the noise density reaches the density α, and lowered to 4 dB or less when the noise density becomes higher than the density α.

As described above, in the stereo receiver according to the embodiment, the extent to which the channel separation is lowered, and the release time are set in accordance with the presence or the absence of multipath noises and the noise density. Particularly when the noise density is low, therefore, phenomena that the reproduced sound is switched from the stereophonic sound to the monophonic sound each time a noise is generated, thereby causing the listener to feel a sense of incongruity, and that the reproduced sound is similar to the monophonic sound for a period longer than that needed can be prevented from occurring.

Furthermore, in the stereo receiver 11 according to the embodiment, the noise density is measured by the plurality of integration circuits having different time constants. When a measured integration output reaches a predetermined level or higher, the channel separation is set to be a value corresponding to the concerned integration circuit. The measurement of the noise density is not restricted to the technique and may be performed by another technique. For example, the time constants of the integration circuits may be set so as to be equal to each other, and a plurality of discrimination levels of the level discriminating circuits such as the base voltages of transistors may be set so as to be different from each other. The integration circuits exceed the discrimination level, it is judged that the noise density reaches the value corresponding to the concerned the discrimination level, and the channel separation controlling means set the channel separation corresponding to the value.

The invention may be embodied in other specific forms without departing from the spirit or the essential characteristics thereof. The present embodiments are therefore to be considered in all respects illustrative and not restrictive, the scope of the invention being indicated by the appended claims rather than by the foregoing description and all changes which come within the meaning and the range of equivalency of the claims are therefore to be intended to be embraced therein.

What is claimed is:

1. A stereo receiver comprising:

receiving means for receiving a signal;

demodulating means for demodulating a received signal in response to an output of the receiving means;

channel separating means for calculating an output of the demodulating means on the basis of a channel separation control signal, separating the demodulated received signal into sound signals for right and left channels at a channel separation which corresponds to a level of the channel separation control signal, and outputting the sound signals;

electric field strength detecting means for detecting an electric field strength of the received signal in response to the output of the receiving means and outputting the channel separation control signal which controls the channel separating means so that, as the electric field strength is lower, the channel separation is lower;

noise extracting means for extracting a noise signal from the received signal in response to the output of the receiving means;

noise density measuring means for measuring a noise density in response to the noise signal of the noise extracting means;

channel separation controlling means for outputting the channel separation control signal which controls the channel separating means in response to an output of the noise density measuring means so that, when the noise density is higher, the channel separation is lowered in a plurality of steps or continuously;

change-over means for supplying the channel separation control signal output from the electric field strength detecting means to the channel separating means when a noise is not extracted by the noise extracting means and supplying the channel separation control signal output from the channel separation controlling means to the channel separating means when the noise is extracted;

wherein the channel separating means sets the channel separation to a value which is less than a predetermined value when the noise signal is extracted and the noise density is not lower than a predetermined density, and sets the channel separation to about 10 dB when the noise signal is extracted and the noise density is lower than a predetermined density;

the predetermined value being set to be a value at which a noise can be sufficiently reduced; and wherein when a noise signal is not extracted from the received signal after the channel separating means is controlled so as to lower the channel separation, the channel separation controlling means performs a control so that the channel separation is made higher in order to be returned to an original value with a lapse of time; and the time-change rate of the channel separation which is made higher with a lapse of time is set to be lower as the noise density is lower.

2. The stereo receiver of claim 1, wherein when the noise density is higher than the predetermined density, the time-change rate of the channel separation is set so that the release time required for returning the channel separation which is set to be lower than the predetermined value, to the channel separation which is determined in accordance with the electric field strength of the received signal is about 1 second or longer.

3. A stereo receiver comprising:

receiving means for receiving a signal;

demodulating means for demodulating a received signal in response to an output of the receiving means;

channel separating means for calculating an output of the demodulating means on the basis of a channel separation control signal, separating the demodulated received signal into sound signals for right and left channels at a channel separation which corresponds to a level of the channel separation control signal, and outputting the sound signals;

electric field strength detecting means for detecting an electric field strength of the received signal in response to the output of the receiving means, and outputting the channel separation control signal which controls the channel separating means so that, as the electric field strength is lower, the channel separation is lower;

noise extracting means for extracting a noise signal from the received signal in response to the output of the receiving means;

noise density measuring means for measuring a noise density in response to the noise signal of the noise extracting means;

channel separation controlling means for outputting the channel separation control signal which controls the channel separating means in response to an output of the noise density measuring means so that, when the noise density is higher, the channel separation is lowered in a plurality of steps or continuously; and change-over means for supplying the channel separation control signal output from the electric field strength detecting means to the channel separating means when a noise is not extracted by the noise extracting means, and supplying the channel separation control signal output from the channel separation controlling means to the channel separating means when the noise is extracted;

wherein the noise density measuring means comprises a plurality of integration circuits which have different integration time constants of charging or discharging the noise signal from the noise extracting means, and a plurality of level discriminating circuits which individually discriminate levels of integration outputs of the integration circuits according to individual predetermined discrimination levels which are equal to each other; and the channel separation controlling means controls the channel separating means in response to outputs of the level discriminating circuits when the output of the level discriminating circuits corresponding to the integration circuit having a larger integration time constant is obtained so that the channel separation is set to a value lower than the value set at the time when the output of the level discriminating means corresponding to the integration circuit having a smaller integration time constant is obtained.

4. The stereo receiver of claim 3, wherein the charging and discharging time constants in the absence of noises are selected to be larger values, the larger the discharging and charging time constants at the time when noises are extracted are, respectively.

5. The stereo receiver of claim 3 wherein each of the level discriminating circuits comprises:

switching means for responding to the output of the integration circuit, and outputting a signal of one level when the level of the output is equal to or higher than the predetermined discrimination level, or outputting a signal of another level when the level of the output is lower than the predetermined discrimination level, and the channel separation controlling means controls the channel separating means so that, when a signal of the one level is obtained from each of the level discriminating circuits, the channel separation has a value corresponding to the level discriminating circuit which has the highest predetermined discrimination level or the largest integration time constant of the corresponding integration circuit, among the level discriminating circuits outputting the signal of the one level.

6. A stereo receiver comprising:

receiving means for receiving a signal;

demodulating means for demodulating a received signal in response to an output of the receiving means;

channel separating means for calculating an output of the demodulating means on the basis of a channel separation control signal, separating the demodulated received signal into sound signals for right and left channels at a channel separation which corresponds to a level of the channel separation control signal, and outputting the sound signals;

electric field strength detecting means for detecting an electric field strength of the received signal in response to the output of the receiving means, and outputting the channel separation control signal which controls the channel separating means so that, as the electric field strength is lower, the channel separation is lower;

noise extracting means for extracting a noise signal from the received signal in response to the output of the receiving means;

noise density measuring means for measuring a noise density in response to the noise signal of the noise extracting means;

channel separation controlling means for outputting the channel separation control signal which controls the channel separating means in response to an output of the noise density measuring means so that, when the noise density is higher, the channel separation is lowered in a plurality of steps or continuously; and change-over means for supplying the channel separation control signal output from the electric field strength detecting means to the channel separating means when a noise is not extracted by the noise extracting means, and supplying the channel separation control signal output from the channel separation controlling means to the channel separating means when the noise is extracted;

wherein the noise density measuring means comprises a plurality of integration circuits which have the same integration time constant of charging or discharging the noise signal from the noise extracting means, and a plurality of level discriminating circuits which individually discriminate levels of integration outputs of the integration circuits according to individual predetermined discrimination levels which are different from each other; and the channel separation controlling means controls the channel separating means in response to outputs of the level discriminating circuits when the output of the level discriminating circuits of a higher discrimination level is obtained so that the channel separation is a value lower than the value obtained at the time when the output of the level discriminating circuits of a lower discrimination level is obtained.

7. The stereo receiver of claim 6, wherein each of the level discriminating circuits comprises:

switching means for responding to the output of the integration circuit, and outputting a signal of one level when the level of the output is equal to or higher than the predetermined discrimination level, or outputting a signal of another level when the level of the output is lower than the predetermined discrimination level, and the channel separation controlling means controls the channel separating means so that, when a signal of the one level is obtained from each of the level discriminating circuits, the channel separation has a value corresponding to the level discriminating circuit which has the highest predetermined discrimination level or the largest integration time constant of the corresponding integration circuit, among the level discriminating circuits outputting the signal of the one level.

* * * * *

UNITED STATES PATENT AND TRADEMARK OFFICE
CERTIFICATE OF CORRECTION

PATENT NO. : 5,784,465
DATED : July 21, 1998
INVENTOR(S) : A. Fujiwara

It is certified that error appears in the above-indentified patent and that said Letters Patent is hereby corrected as shown below:

On the title page: Item [73]

change the name of the "Assignee" to --FUJITSU TEN LIMITED, Kobe-shi, Kyogo, Japan--; and change the name of the "Attorney, Agent or Firm" to --WENDEROTH, LIND & PONACK, L.L.P.--.

Signed and Sealed this

Twelfth Day of January, 1999

Attest:

Attesting Officer      *Acting Commissioner of Patents and Trademarks*